(12) United States Patent
Matsumoto

(10) Patent No.: US 8,549,942 B2
(45) Date of Patent: Oct. 8, 2013

(54) MULTI-STAGE TRANSMISSION

(75) Inventor: Shinya Matsumoto, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 440 days.

(21) Appl. No.: 12/920,660

(22) PCT Filed: Feb. 23, 2009

(86) PCT No.: PCT/JP2009/053175
§ 371 (c)(1),
(2), (4) Date: Sep. 2, 2010

(87) PCT Pub. No.: WO2009/122814
PCT Pub. Date: Oct. 8, 2009

(65) Prior Publication Data
US 2011/0000334 A1    Jan. 6, 2011

(30) Foreign Application Priority Data

Mar. 31, 2008  (JP) ................. 2008-093703

(51) Int. Cl.
*F16H 3/10* (2006.01)
*F16H 59/00* (2006.01)

(52) U.S. Cl.
USPC .......................................... 74/325; 74/337.5

(58) Field of Classification Search
USPC ........ 74/335, 337.5, 362, 363, 366, 368, 369, 74/371, 372, 325
See application file for complete search history.

(56) References Cited

U.S. PATENT DOCUMENTS

| | | |
|---|---|---|
| 2,416,154 A | 2/1947 | Chilton |
| 3,067,626 A | 12/1962 | Doerries et al. |
| 4,283,969 A | 8/1981 | Lapeyre |
| 4,376,394 A | 3/1983 | Lapeyre |
| 4,515,031 A | 5/1985 | Janson |
| 5,280,731 A | 1/1994 | Turpin |
| 5,445,044 A | 8/1995 | Lee |
| 6,427,550 B1 | 8/2002 | Bowen |
| 6,637,283 B2 | 10/2003 | Belloso |
| 6,675,667 B1 | 1/2004 | Pelletier et al. |
| 6,786,107 B2 | 9/2004 | Matsumoto et al. |
| 6,898,993 B2 | 5/2005 | Matsumoto et al. |
| 6,931,956 B2 | 8/2005 | Thery |
| 6,978,692 B2 | 12/2005 | Thery |
| 7,004,487 B2 | 2/2006 | Matsumoto et al. |

(Continued)

FOREIGN PATENT DOCUMENTS

| | | |
|---|---|---|
| DE | 10 2005 053 315 A1 | 5/2007 |
| FR | 1037450 A | 9/1953 |
| FR | 2 806 143 A1 | 9/2001 |
| JP | 34-6713 | 5/1959 |

(Continued)

*Primary Examiner* — William C Joyce
(74) *Attorney, Agent, or Firm* — Birch, Stewart, Kolasch & Birch, LLP

(57) ABSTRACT

A multi-stage transmission has driving gears m and driven gears n that mesh constantly and are supported on a hollow driven gear shaft. The driven gears n are individually engageable with and disengageable from the hollow driven gear shaft. Swing pawl members control engagement and disengagement between each of the driven gears n and the driven gear shaft, and cam rods inserted in the driven gear shaft to slide relative to the internal surface of the shaft to operate the swing pawl members. Gear shift driving member includes a shift drum, a control rod in sliding contact with the inner surface of the cam rods to axially move the cam rods, and a control rod operating element responsive to rotation of the shift drum to move the control rod. The control rod and the driven gear shaft are prevented from relative rotation by an anti-rotation mechanism.

6 Claims, 17 Drawing Sheets

(56) References Cited

U.S. PATENT DOCUMENTS

| | | |
|---|---|---|
| 7,083,540 B2 | 8/2006 | Janson et al. |
| 7,107,865 B2 | 9/2006 | Tomita et al. |
| 7,462,121 B2 | 12/2008 | Janson et al. |
| 7,765,886 B2 | 8/2010 | Hori et al. |
| 7,770,480 B2 | 8/2010 | Martin |
| 7,882,758 B2 | 2/2011 | Kubo et al. |
| 8,302,501 B2 | 11/2012 | Matsumoto |
| 2003/0213318 A1 | 11/2003 | Matsumoto et al. |
| 2004/0149080 A1 | 8/2004 | Pollak |
| 2011/0005343 A1 | 1/2011 | Matsumoto |

FOREIGN PATENT DOCUMENTS

| | | |
|---|---|---|
| JP | 45-35687 B1 | 11/1970 |
| JP | 50-74650 | 6/1975 |
| JP | 54-38040 A | 3/1979 |
| JP | 54-108169 A | 8/1979 |
| JP | 54-114670 A | 9/1979 |
| JP | 55-10151 A | 1/1980 |
| JP | 56-37748 U | 4/1981 |
| JP | 64-53658 U | 4/1989 |
| JP | 2-51663 A | 2/1990 |
| JP | 2005-239060 A | 9/2005 |
| JP | 3838494 B2 | 10/2006 |
| WO | WO 00/08357 A1 | 2/2000 |
| WO | WO 02/075179 A1 | 9/2002 |

MULTI-STAGE TRANSMISSION

TECHNICAL FIELD

The present invention relates to a multi-stage transmission in which a plurality of drive gears and a plurality of driven gears are supported respectively on parallel gear shafts in a state of being constantly meshed to constitute meshing gear combinations for different speeds.

BACKGROUND ART

The constantly meshed type multi-stage transmission has a configuration in which one of the drive gears and the driven gears are fixed on a gear shaft, while the other of the drive gears and the driven gears are rotatably supported on another gear shaft, and in which one of the rotatably supported gears is selected to be engaged with the other gear shaft by an engaging means, to make a gear shift.

There is a patent publication disclosing a multi-stage transmission by the present applicant, in which engaging pawls driven by cam members are used for the engagement between the gear and the gear shaft (Patent Document 1).

[Patent Document 1]
Japanese Patent No. 3838494

The transmission disclosed in Patent Document 1 has a structure in which a cam member (clutch operating element) formed with a cam groove is axially moved in a hollow gear shaft (transmission shaft) rotatably supporting gears thereon, and pin members penetrating the wall of the hollow gear shaft are thereby moved radially outwards and inwards to cause free ends of ratchet pawls fitted in an inner peripheral part of the gear to project or retract from the inner peripheral surface. When the free ends of the ratchet pawls are projected, they are engaged with gear teeth formed on the hollow gear shaft so as to transmit rotation in one direction, and when the ratchet pawls are retracted, the engagement is released.

An end part of the cam member is engaged with a shift plate, and turning of the shift plate moves the cam member in the axial direction.

Besides, turning of a cable winding member, around which a cable to be manipulated by the driver is wound, is transmitted to the shift plate through a lost motion mechanism.

DISCLOSURE OF THE INVENTION

Problems to be Solved by the Invention

The cam member moved in the axial directions in response to the turning of the shift plate is movable only in the axial directions and is not rotatable, and the non-rotatable cam member is inserted in the hollow gear shaft, which is rotated. Therefore, there is a friction loss between the cam member and the hollow gear shaft.

In view of this, it may be attempted to interpose bearings between the cam member and the hollow gear shaft, for reducing the friction loss. Such an attempt, however, meets a difficulty in that, since the bearings are provided on the small-diameter inner peripheral surface of the hollow gear shaft in contact with the cam member, expensive needle bearings or the like which require a small space is needed.

The present invention has been made in consideration of the above-mentioned problems. Accordingly, it is an object of the present invention to provide a multi-stage transmission which has little friction loss and is inexpensive.

Means for Solving the Problems

In order to attain the above object, the present invention provides a multi-stage transmission wherein a drive gear shaft and a driven gear shaft are disposed in parallel; a plurality of drive gears and a plurality of driven gears are supported on the drive gear shaft and the driven gear shaft, respectively, in a manner that the drive gears and the driven gears are constantly meshed with each other to constitute meshing gear combinations for different speeds; one of the drive gears and the driven gears are fixed to the gear shaft supporting the same, while the gear shaft supporting the other of the drive gears and the driven gears is a hollow gear shaft; and the other gears are supported on the hollow gear shaft individually in an engageable and disengageable manner through engaging means, which are operated by gear shift driving means for gear shift:

the engaging means comprising: engaging parts provided on an inner peripheral surface of each of the other gears at circumferentially spaced positions and having engaging surfaces in circumferential directions; engaging members which are provided in the hollow gear shaft and are engageable respectively with the engaging parts of the other gears each in one rotational direction; and cam rods which have sliding surfaces, respectively, in sliding contact with an inner peripheral surface of an inner hole of the hollow gear shaft so as to be movable in axial directions, and are each provided at axially spaced locations with a plurality of cam surfaces for acting on the engaging members when moved axially;

the gear shift driving means comprising: a control rod disposed axially slidably in the inner hole of the hollow gear shaft in sliding contact with the cam rods; and the control rod and the hollow gear shaft being inhibited from relative rotation by an anti-rotation mechanism.

Preferably, the gear shift driving means includes: a shift drum rotatingly driven by an actuator; a control rod operating element which is in engagement with a guide groove in the shift drum and is movable axially of the hollow gear shaft upon rotation of the shift drum, to operate the control rod through a bearing.

According to a preferred mode of practice of the invention, the anti-rotation mechanism includes mutually engaging splines between an end portion of the hollow gear shaft and the control rod, and some of the splines are eliminated to form a lubricant passage. Further, the engaging means includes swing pawl members swingable about pivot pins on the hollow gear shaft.

Effects of the Invention

According to the multi-stage transmission of the invention, the control rod and the hollow gear shaft are inhibited from relative rotation by the anti-rotation mechanism, so that the control rod and the gear shaft are rotated together. Therefore, the cam rods between them is also rotated together, so that friction loss between the control rod and the cam rods or the hollow gear shaft can be reduced.

In addition, it is not necessary to provide a bearing in the small space between the inner surfaces of the cam rods and the control rod. Instead, at that portion of the control rod which projects outwards beyond the interior of the hollow gear shaft and at which a space is available, the bearing is provided between the portion and the control rod operating element. Therefore, an inexpensive ball bearing can be used as the bearing.

The splines are provided between the end part of the hollow gear shaft and the control rod as an anti-rotation mechanism, and the teeth of the splines are partly eliminated to form a lubricating oil passage. Therefore, the splines with the teeth thereof partly removed can function both as an anti-rotation mechanism against relative rotation between the control rod and the hollow gear shaft and as the lubricating oil passage for

DESCRIPTION OF REFERENCE SIGNS m . . . Drive transmission gears; m1 to m5 . . . 1st to 5th drive transmission gears; n . . . Driven transmission gears; n1 to n5 . . . 1st to 5th driven transmission gears;
10 . . . Multi-stage transmission; 11 . . . Main gear shaft; 12 . . . Counter gear shaft; 12ss . . . Spline teeth; 20 . . . Engaging means; 21 . . . First cam rod; 22 . . . Second cam rod; 21v, 22v . . . Cam groove; 31 . . . Engaging projection; 50 . . . Gear shift driving means; 51 . . . Control rod; 51s . . . Spline part; 51v . . . Engaging groove; 54 . . . Collar member; 55 . . . Engaging pin; 60 . . . Gear shift driving motor; 61 . . . Bearing; 62 . . . Geneva driving gear; 63 . . . Geneva driven gear; 65 . . . Shift drum; 70 . . . Control rod operating element; 71 . . . Ball bearing.

BEST MODE FOR CARRYING OUT THE INVENTION

Now, an embodiment of the present invention will be described below with reference to FIGS. 1 to 24.

A multi-stage transmission 10 according to the present embodiment is used in combination with an internal combustion engine mounted on a motorcycle.

Figure 1:
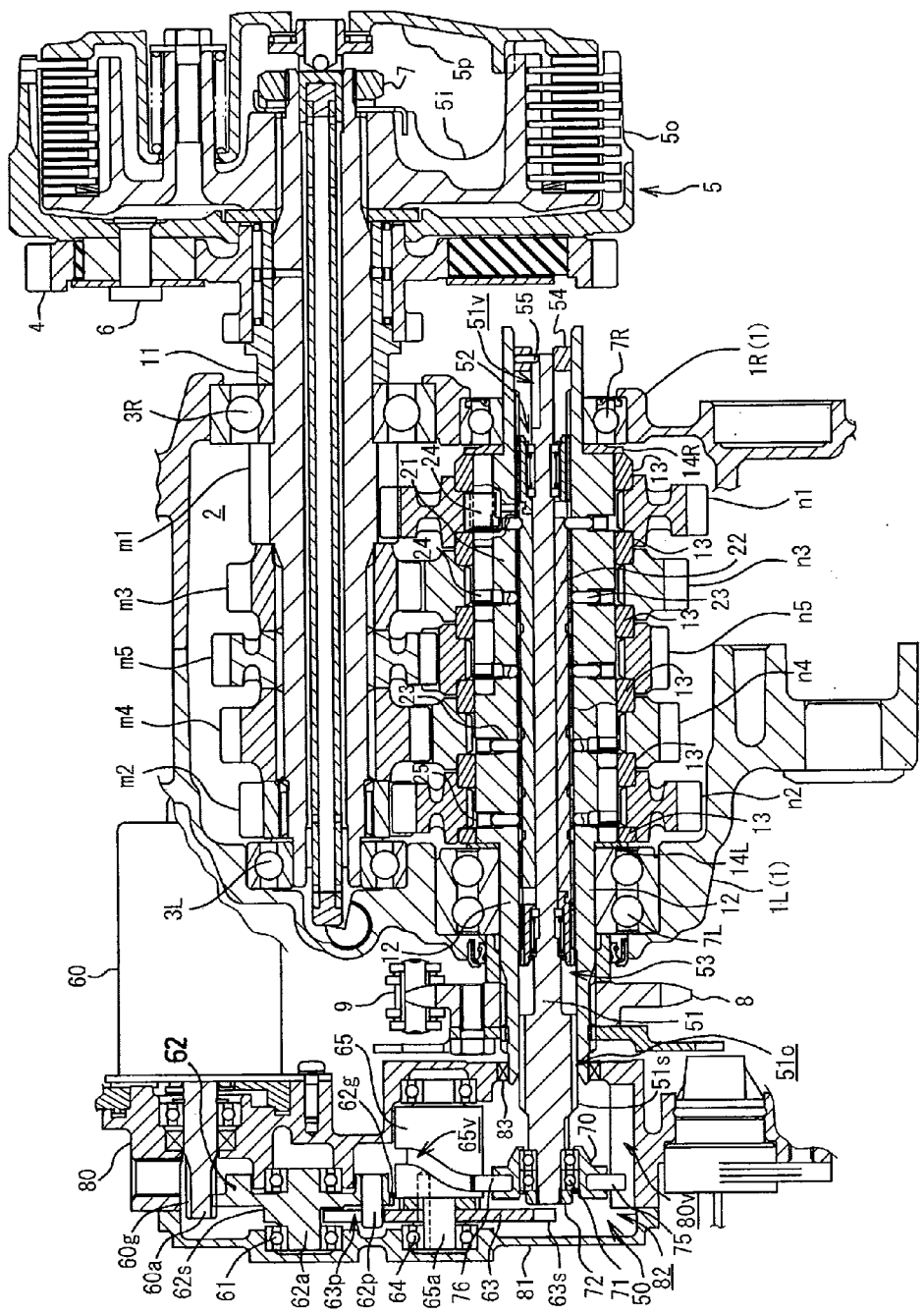
FIG. 1 is a sectional view of a multi-stage transmission according to one embodiment of the present invention.

FIG. 1 is a sectional view of the multi-stage transmission 10. As shown in FIG. 1, the multi-stage transmission 10 is installed in an engine case 1 which is common to the internal combustion engine.

The engine case 1 is of a left-right split type and is made by coupling a left engine case 1L and a right engine case 1R. The engine case 1 defines a transmission chamber 2, in which a main gear shaft 11 and a counter gear shaft 12 are rotatably supported in parallel to each other and in left-right orientation.

The main gear shaft 11 is rotatably supported in side walls of the left engine case 1L and the right engine case 1R through bearings 3L and 3R, respectively, and a multiple-disk friction clutch 5 is provided at a right end part of the main gear shaft 11, which protrudes from the transmission chamber 2 by penetrating the right bearing 3R.

On the left side of the friction clutch 5, a primary driven gear 4, to which rotation of a crankshaft (not shown) is transmitted, is rotatably supported on the main gear shaft 11.

The friction clutch 5 has a structure in which a clutch inner element 5i is spline-fitted over a right end part of the main gear shaft 11 and fixed to the right end part by a nut 7, and in which a large-diameter, bowl-shaped clutch outer element 5o is connected to the primary driven gear 4 by connecting means 6, the clutch outer element 5o accommodating therein the clutch inner element 5i and a pressure plate 5p combined with the clutch inner element 5i.

Therefore, the rotation of the crankshaft of the internal combustion engine is transmitted from the primary driven gear 4 to the main gear shaft 11 through the friction clutch 5 in an engaged (connected) state thereof.

On the other hand, the counter gear shaft 12 is also rotatably supported in the side walls of the left engine case 1L and the right engine case 1R through bearings 7L and 7R, respectively, and an output sprocket 8 is fixed by spline-fit to a left end part of the counter gear shaft 12, protruding from the transmission chamber 2 by penetrating the left bearing 7L.

A drive chain 9 wrapped around the output sprocket 8 is wrapped around a sprocket for driving a rear wheel (not shown) of the motorcycle, whereby the rotational power of the counter gear shaft 12 is transmitted to the rear wheel, and the motorcycle is made to run.

Between the left and right bearings 3L and 3R, a group of drive transmission gears (m) are provided on the main drive shaft 11 so that they can each be rotated as one body with the main gear shaft 11.

A 1st drive transmission gear m1 is formed as one body with the main gear shaft 11 along the right bearing 3R, and 3rd, 5th, 4th, and 2nd drive transmission gears m3, m5, m4, and m2 in this order from the right to the left side are fixed by spline-fit to the main gear shaft 11 through splines extending between the 1st drive transmission gear m1 and the left bearing 3L.

On the other hand, a group of driven transmission gears (n) are supported on the counter gear shaft 12 between the left and right bearings 7L and 7R through annular bearing collar members 13 therebetween so that they can be rotated relative to the main gear shaft 11.

On the counter gear shaft 12, the bearing collar member 13 at the right end is externally mounted through a collar ring 14R fitted on the counter gear shaft 12 at the left side of the right bearing 7R, while the bearing collar member 13 at the left end is externally mounted on the counter gear shaft 12 through a collar ring 14L fitted on the counter gear shaft 12 at the right of the left bearing 7L. In addition, four bearing collar members 13 are externally mounted on the counter gear shaft 12 at regular intervals between the right-end bearing collar member 13 and the left-end bearing collar member 13, and 1st, 3rd, 5th, 4th, and 2nd driven transmission gears n1, n3, n5, n4, and n2 in this order from the right to the left side are rotatably supported on the counter gear shaft 12 in such a manner that these driven transmission gears bridge adjacent ones of the total of six bearing collar members 13.

The 1st, 3rd, 5th, 4th, and 2nd drive transmission gears m1, m3, m5, m4, and m2 each rotated as one body with the main gear shaft 11 are normally meshed respectively with the corresponding 1st, 3rd, 5th, 4th, and 2nd driven transmission gears n1, n3, n5, n4, and n2 which are rotatably supported on the counter gear shaft 12.

The meshing of the 1st drive transmission gear m1 with the 1st driven transmission gear n1 constitutes the 1st gear speed corresponding to a highest reduction gear ratio, while the meshing of the 5th drive transmission gear m5 with the 5th driven transmission gear n5 constitutes the 5th gear speed corresponding to a lowest reduction gear ratio, and the reduction gear ratio is sequentially decreased therebetween to constitute the 2nd, 3rd, and 4th gear speeds.

The counter gear shaft 12, which is tubular in shape, is provided therein with engaging means 20 (FIG. 13) capable of engaging with each of the driven transmission gears (n), as will be described later in detail. A total of four cam rods, that is, first and second cam rods 21, 21 and 22, 22 as components of the engaging means 20 are axially slidably fitted in the inner peripheral surface of the counter gear shaft 12.

Figure 10:
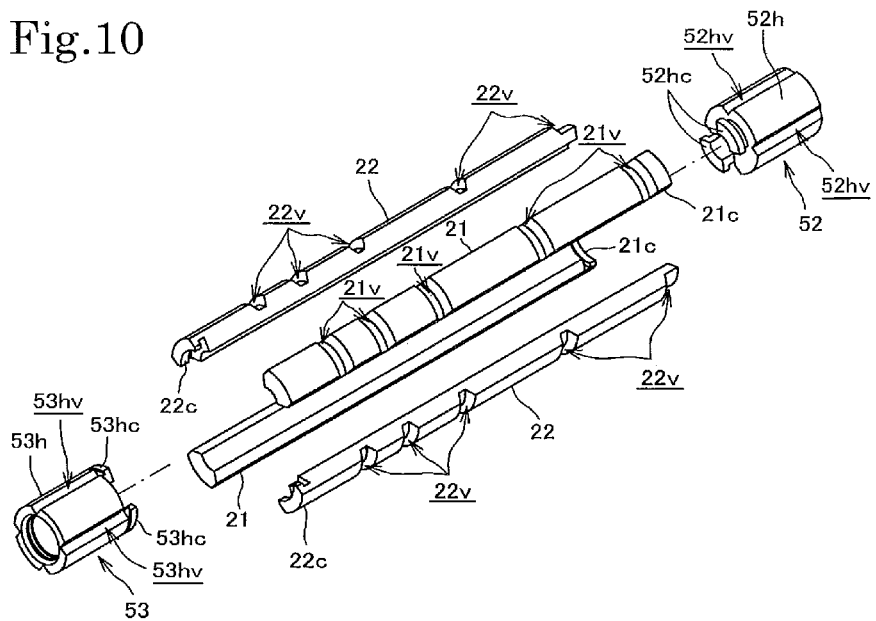
FIG. 10 is an exploded perspective view of cam rods and lost motion mechanisms.

As shown in FIG. 10, the four first and second cam rods 21, 21 and 22, 22 are substantially in such shapes that a hollow cylinder is evenly divided into four sections arrayed in the circumferential direction; the cam rods are classified into two kinds, i.e., the first cam rods 21 and the second cam rods 22, and each pair of the cam rods of the same kind are located at diametrically symmetrical positions.

The first and second cam rods 21 and 22 are cam members of which the sliding contact surfaces in sliding contact with the inner peripheral surface of the counter gear shaft 12 constitute cam surfaces. The first and second cam rods 21 and 22 are provided with circumferentially extending arcuate cam grooves 21v and 22v respectively at five required locations along the axial direction of the counter gear shaft.

A control rod 51 is a component of gear shift driving means 50 for driving the first and second cam rods 21 and 22 by gear shift. The control rod 51 is inserted in the counter gear shaft 12 concentrically therewith and in sliding contact with the inner surfaces of the four first and second cam rods 21, 21 and 22, 22. Movement of the control rod 51 in the axial direction causes the first and second cam rod 21, 21 and 22, 22 to also move through lost motion mechanisms 52 and 53, respectively.

A mechanism for moving the control rod 51 in the axial direction is provided on the left side of the left engine case 1L.

A power transmission case 80 is provided on the left side of the left engine case 1L so as to cover the output sprocket 8, and the left side of the power transmission case 80 is covered with a case cover 81, so as to define a gear shift driving chamber 82 between the power transmission case 80 and the case cover 81.

The left end of the counter gear shaft 12 is fitted in an opening in the power transmission case 80 through a seal member 83 so as to face the gear shift driving chamber 82, and the control rod 51 in the counter gear shaft 12 projects leftwards beyond the left end of the counter gear shaft 12, into the gear shift driving chamber 82.

On the upper side of the power transmission case 80 is firmly attached a gear shift driving motor 60, with its drive shaft 60a protruding into the gear shift driving chamber 82 on the left side.

A Geneva driving gear 62 is provided between the power transmission case 80 and the case cover 81 and has its integral rotary shaft 62a rotatably supported by bearings 61 and 61. Teeth 62g of the Geneva driving gear 62 are meshed with drive gear teeth 60g formed on the drive shaft 60a of the gear shift driving motor 60.

The Geneva driving gear 62 is provided with an operating pin 62p projecting leftwards at a position offset by a predetermined distance from the center of rotation of the Geneva driving gear 62. The Geneva driving gear 62 is formed with a raised surface 62s of an arcuate shape of a predetermined radius on the opposite side, with respect to the center of rotation, from the operating pin 62p (see FIGS. 1, 2 and 3).

Besides, in the gear shift driving chamber 82, between the Geneva driving gear 62 and the left end part of the control rod 51, a shift drum 65 is provided between the power transmission case 80 and the case cover 81, with a rotary shaft 65a of the shift drum 65 rotatably supported by bearings 64 and 64.

The shift drum 65 is provided with a guide groove 65v in the outer peripheral surface of the drum.

Figure 4:
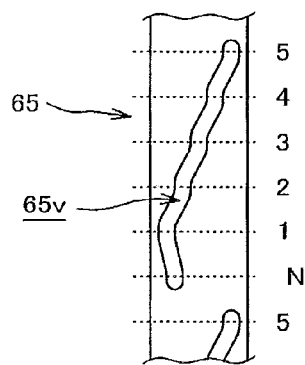
FIG. 4 is a development of an outer peripheral surface of a shift drum.

FIG. 4 shows a development of the outer peripheral surface of the shift drum 65. The guide groove 65v is so formed that a neutral (N) position is provided at a position toward the left side, a 1st gear speed position apart by 60 degrees along the circumferential direction from the neutral (N) position is provided at a position displaced to the right side in the axial direction relative to the neutral (N) position, and 2nd, 3rd, 4th, and 5th gear speed positions apart by 60 degrees each from the 1st gear speed position are successively provided at positions sequentially displaced to the right side in the axial direction from the 1st gear speed position.

A Geneva driven gear 63 is fitted on the rotary shaft 65a of the shift drum 65, correspondingly to the Geneva driving gear 62.

Figure 2:
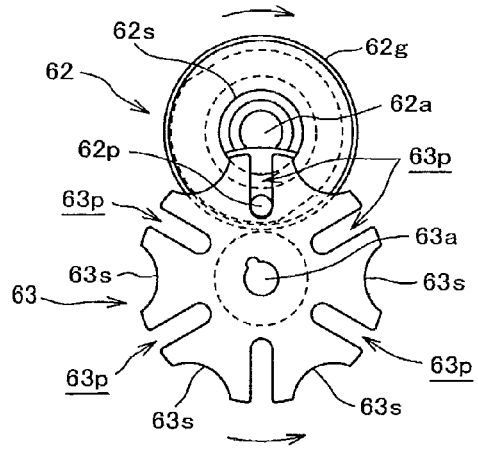
FIG. 2 illustrates a Geneva stop mechanism in gear shift driving means.
Figure 3:
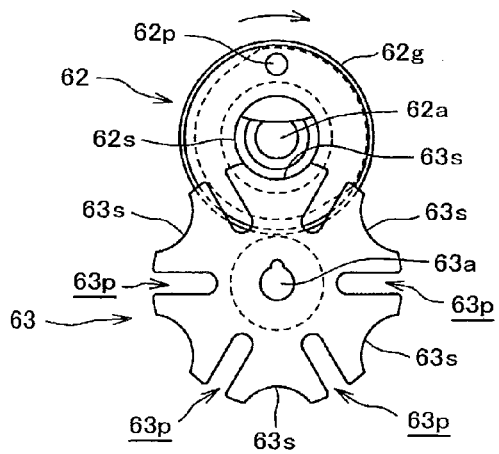
FIG. 3 illustrates the Geneva stop mechanism in another state.

As shown in FIGS. 2 and 3, the Geneva driven gear 63 is provided with six radially orientated grooves 63p at regular angular intervals of 60 degrees in the circumferential direction, and an arcuate recessed surface 63s is formed between each pair of adjacent radial grooves 63p and 63p.

The Geneva driving gear 62 and the Geneva driven gear 63 constitute a ⅙-revolution Geneva stop mechanism.

Specifically, as shown in FIG. 2, from the moment when the operating pin 62p turned by the rotation of the Geneva driving gear 62 enters one radial groove 63p in the Geneva driven gear 63 until it comes out of the radial groove 63p, it rotates the Geneva driven gear 63 by ⅙ revolution. At the time when the operating pin 62p comes out of the radial groove 63p, the arcuate raised surface 62s of the Geneva driving gear 62 is engaged with the arcuate recessed surface 63s of the Geneva driven gear 63, whereby the Geneva driven gear 63 is locked and fixed, as shown in FIG. 3.

Therefore, with one revolution of the Geneva driving gear 62, the Geneva driven gear 63 is securely rotated by ⅙ revolution as one body with the shift drum 65.

Referring to FIG. 1, the inner races of two ball bearings 71 and 71 are firmly attached to the left end part of the control rod 51 by a nut 72, and a control rod operating element 70 is fitted over the outer races of the ball bearings 71 and 71.

An engaging pin 75 projecting from the control rod operating element 70 is in sliding engagement with an elongate groove 80v formed in the power transmission case 80 to extend in the left-right direction.

In addition, separately from this, a guide pin 76 is provided on the control rod operating element 70 to project toward the shift drum 65, and is in sliding engagement with the guide groove 65v in the shift drum 65.

Therefore, the control rod operating element 70 rotatably holds the left end part of the control rod 51 while being restricted in its own rotation due to the engagement of the engaging pin 75 with the elongated groove 80v.

When the shift drum 65 is intermittently rotated as abovementioned, the control rod operating element 70 is moved along the left-right axial direction through the guide pin 76 engaged with the guide groove 65v in the shift drum 65, and therefore, the movement of the control rod operating element 70 moves the control rod 51 by a required amount in the axial direction through the two ball bearings 71 and 71.

The movement of the control rod 51 in the axial direction moves the cam rods 21 and 22 through the lost motion mechanism 52 and 53, respectively, and the movement of the cam rods 21 and 22 causes the engaging means 20 incorporated in the counter gear shaft 12 to selectively engage one of the driven transmission gears (n) with the counter gear shaft 12, to achieve a gear shift for establishing a new transmission condition).

Now, the structure of the engaging means 20 will be described below with reference to FIGS. 5 to 15.

Figure 9:
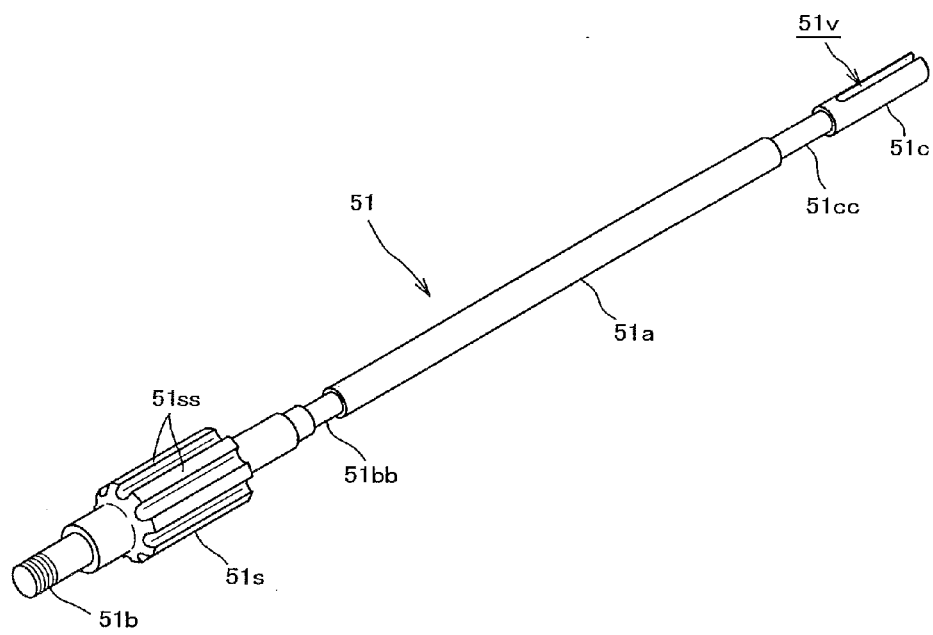
FIG. 9 is a perspective view of a control rod.

First, the control rod 51 of the gear shift driving means 50 will be described referring to FIG. 9.

The control rod 51 is provided with an elongated central cylindrical part 51a having an outer diameter for sliding contact with the inside surfaces of the four cam rods 21, 21 and 22, 22. The control rod 51 is further provided on the left side in sequential order with a reduced-diameter part 51bb, a spline part 51s having spline teeth 51ss, and a left-end cylindrical part 51b, and on the right side in sequential order with a reduced-diameter part 51cc and a right-end cylindrical part 51c in which an engaging groove 51v oriented in the axial direction is cut.

The maximum diameter of the spline teeth 51ss of the spline part 51s is approximately equal to the inner diameter of the counter gear shaft 12.

Referring to FIG. 10, the four first and second cam rods 21, 21 and 22, 22 in sliding contact with the outer surface of the central cylindrical part 51a of the control rod 51 are, as mentioned above, substantially in such shapes that a hollow cylinder is evenly divided into four sections arrayed in the circumferential direction. The outer peripheral surfaces of the first and second cam rods 21, 21 and 22, 22 as the sliding contact surfaces in sliding contact with the inner peripheral surface of the counter gear shaft 12 are provided with the arcuate cam grooves 21v and 22v extending circumferentially of the cam rods at five spaced-apart locations along the axial direction.

The cam grooves 21v and 22v are each so formed that the opposite side surfaces extending from the groove bottom surface are appropriately inclined so that the cam grooves open wider toward the outer side.

Figure 11:
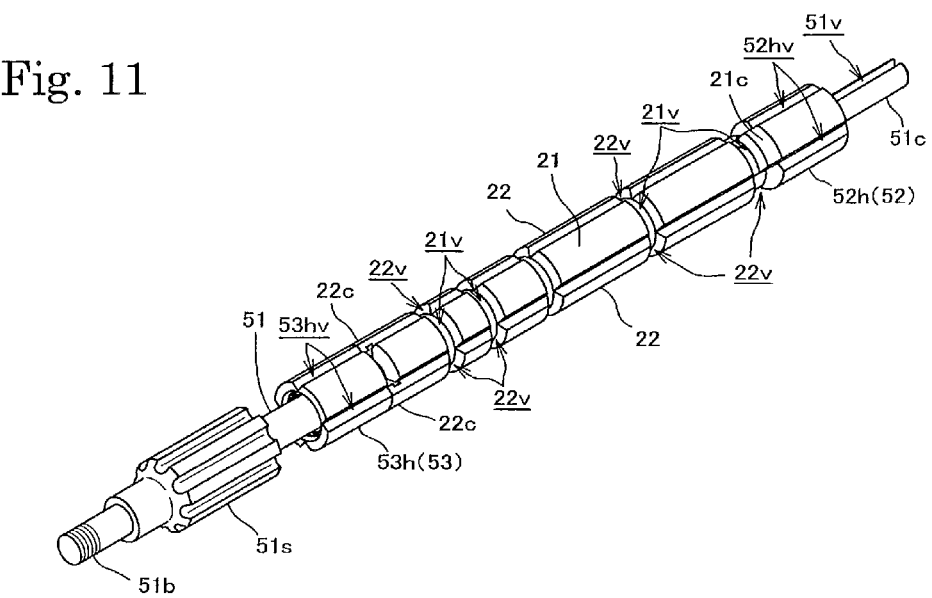
FIG. 11 is a perspective view showing a state in which the cam rods and the lost motion mechanisms are mounted on the control rod.

Mutually adjoining opposite side edges of the outer peripheral surfaces of the first and second cam rods 21 and 22 are cut in a slanted manner so that, when adjacent cam rods come into contact with each other, an axial notch (v) with a V-shaped cross section is formed between adjoining cam rods (see FIG. 11).

The two first cam rods 21 and 21 of the same kind are located at diametrically symmetrical positions and have right ends slightly extended axially and provided with lock claws 21c and 21c, while the two second cam rods 22 and 22 have left ends slightly extended axially and provided with lock claws 22c and 22c.

Figure 5:
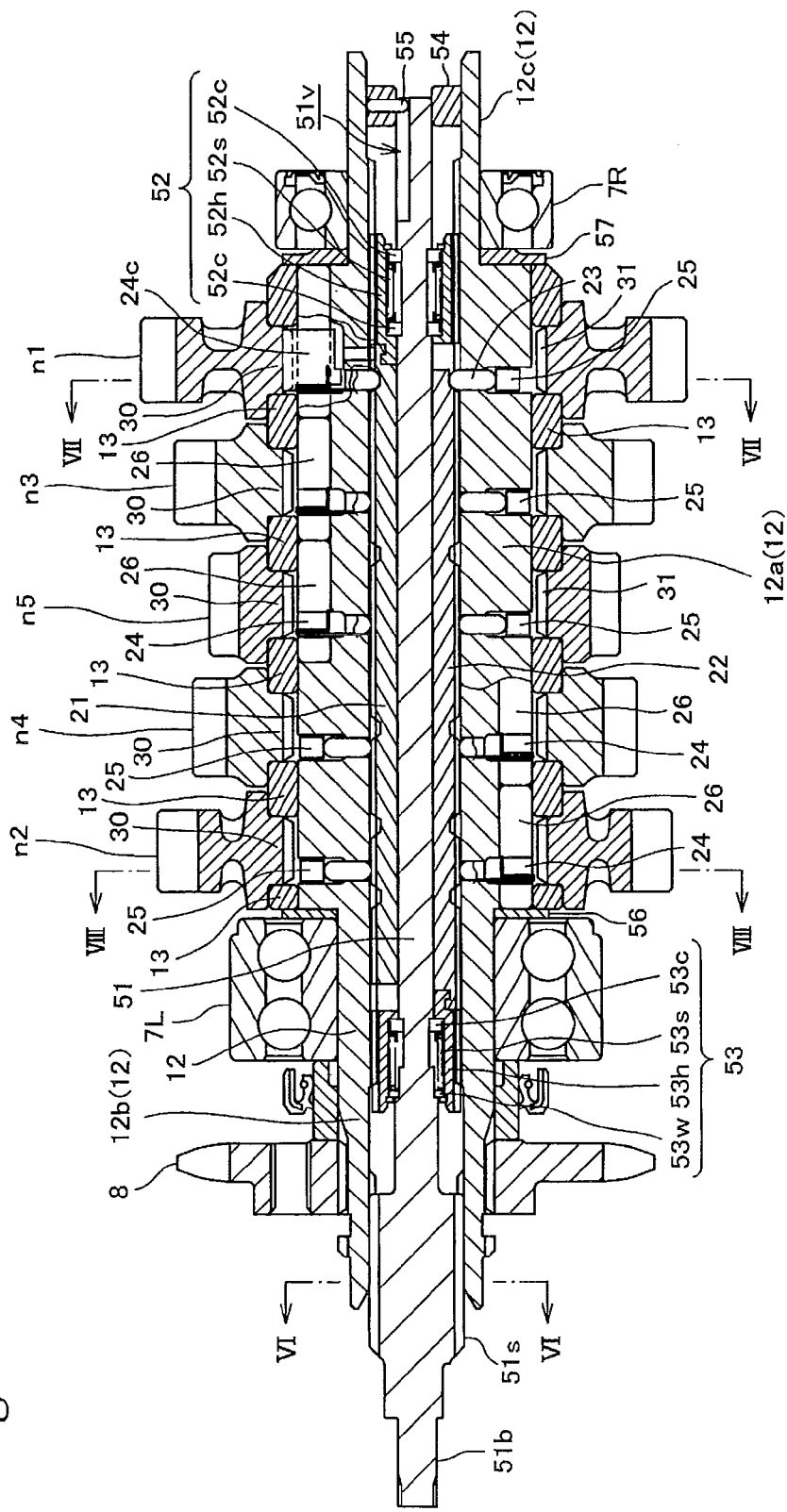
FIG. 5 is a sectional view showing the structure of a counter gear shaft and surrounding elements thereof.

The lost motion mechanism 52 on the right side has a spring 52s retained, as shown in FIG. 5, between an inner peripheral recessed part of a hollow cylindrical spring holder 52h. The spring 52s is slidably fitted around the right-side reduced-diameter part 51cc of the control rod 51, and is clamped between split cotters 52c and 52c on both sides, which are fitted in both the inner peripheral recessed part and the reduced-diameter part 51cc.

The left end surface of the spring holder 52h opposed to the two first cam rods 21 and 21 projects axially to form lock claws 52hc and 52hc for locking engagement with the lock claws 21c and 21c of the first cam rods 21 and 21.

Similarly, as shown in FIG. 5, the lost motion mechanism 53 on the left side has a spring 53s retained in an inner peripheral recessed part of a hollow cylindrical spring holder 53h, and the spring 53s is slidably fitted around the left-side reduced-diameter part 51bb of the control rod 51. The spring 53s is clamped between a split cotter 53c and a washer 53w on both sides, which are fitted in both the inner peripheral recessed part and the reduced-diameter part 51bb.

The right end surface of the spring holder 53h opposed to the two second cam rods 22 and 22 projects axially to form lock claws 53hc and 53hc for locking engagement with the lock claws 22c and 22c of the second cam rods 22 and 22.

As shown in FIGS. 10 and 11, the outer peripheral surfaces of the spring holders 52h and 53h are provided with notch grooves 52hv and 53hv, respectively. The notch grooves 52hv and 53hv are V-shaped in cross section and provided at four positions at regular angular intervals along the circumferential direction, correspondingly to the notches in the outer peripheral surfaces of the first and second cam rods 21 and 22.

As shown in FIG. 11, the lost motion mechanisms 53 and 52 are mounted to the left and right reduced-diameter parts 51bb and 51cc of the control rod 51, respectively, and the four first and second cam rods 21, 21 and 22, 22 are put in sliding contact with the outer periphery of the central cylindrical part 51a between the spring holders 52h and 53h.

In this case, the first and second cam rods 21 and 22 of the different kinds are circumferentially alternately disposed so that each pair of the cam rods of the same kind are located at diametrically symmetrical positions. Besides, the first cam rods 21 and 21 have their lock claws 21c and 21c at their right ends in locking engagement with the lock claws 52hc and 52hc of the spring holder 52h on the right side, while the second cam rods 22 and 22 have their lock pawls 22c and 22c at their left ends in locking engagement with the lock claws 53hc and 53hc of the spring holder 53h on the left side.

In the state where the four first and second cam rods 21, 21 and 22, 22 are mounted on the periphery of the control rod 51 together with the lost motion mechanisms 52 and 53 in the above manner, the assembly is fitted into the internal hole of the hollow cylindrical counter gear shaft 12.

The inner peripheral surface of the counter gear shaft 12 is provided with axially oriented slightly projected ribs at four positions at regular intervals along the circumferential direction, at portions corresponding to the first and second cam rods 21, 21 and 22, 22 and the spring holders 52h and 53h. The first and second cam rods 21, 21 and 22, 22 and the spring holders 52h and 53h have the V-shaped notches (v) and the notch grooves 52hv and 53hv, which are fitted over the projected ribs of the inner peripheral surface of the counter gear shaft 12, whereby they are positioned and restrained from relative rotation in the circumferential direction while they are kept in sliding contact so as to be movable in the axial direction only.

Figure 6:
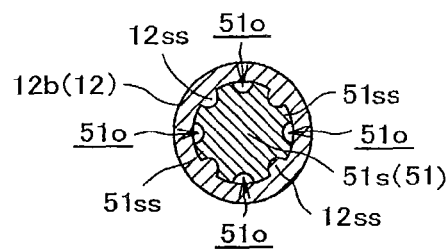
FIG. 6 is a sectional view taken along line VI-VI of FIG. 5.

Referring to FIGS. 5 and 6, the inner peripheral surface of the counter gear shaft 12 is provided, at its portion corresponding to the spline part 51s of the control rod 51, with spline teeth 12ss to be meshed with the spline teeth 51ss on the side of the control rod 51, whereby the control rod 51 is put in sliding contact so as to be movable in the axial direction while being restrained from rotation, relative to the counter gear shaft 12.

While eight spline teeth 51ss are provided on the control rod 51, only four spline teeth 12ss are provided on the counter gear shaft 12, and the portions of the missing spline teeth form communicating holes which serve as lubricating oil passages 51o.

Furthermore, as shown in FIG. 5, an annular collar member 54 press-fitted into a right-end opening of the counter gear shaft 12 holds a right-end cylindrical part 51c of the control rod 51, and an engaging pin 55 projecting from the collar member 54 toward the center is engaged in an axial engaging groove 51v cut in the right-end cylindrical part 51c.

Therefore, the control rod 51 is so supported that it is movable in the axial direction while restrained from rotation, due to the engagement at the opposite ends by the above-mentioned anti-rotation mechanisms, relative to the counter gear shaft 12.

When the control rod 51 and the lost motion mechanisms 52 and 53 and the four first and second cam rods 21, 21 and 22, 22 are put in the internal hole of the counter gear shaft 12, all these components are rotated together. Besides, when the control rod 51 is moved in the axial direction, the first cam rods 21 and 21 are moved in the axial direction relatively to the counter gear shaft 12 through the spring 52s of the lost motion mechanism 52, and the second cam rods 22 and 22 are moved in the axial direction relatively to the counter gear shaft 12 through the spring 53s of the lost motion mechanism 53.

Figure 12:
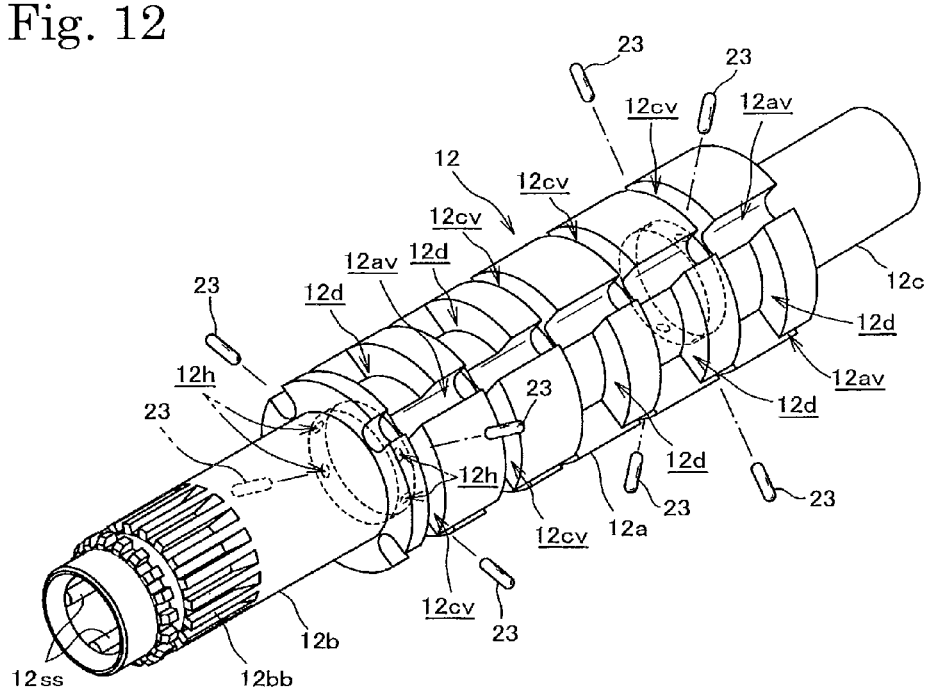
FIG. 12 is an exploded perspective view of the counter gear shaft and pin members.

As shown in the perspective view of FIG. 12, the hollow cylindrical counter gear shaft 12 is provided with a left-side cylindrical part 12b and a right-side cylindrical part 12c which are reduced in outer diameter and are located respectively on both the left and right sides of the central cylindrical part 12a. The central cylindrical part 12a contains the first and second cam rods 21, 21 and 22, 22 therein and supports the driven transmission gears (n) thereon.

A bearing 7L is fitted over the left-side cylindrical part 12b through a washer 56 (see FIG. 5), and the left-side cylindrical part 12b is partly provided with splines 12bb with which the output sprocket 8 is spline-engaged.

In addition, a bearing 7R is fitted over the right-side cylindrical part 12c through a washer 57 (see FIG. 5).

As shown in FIG. 12, the central cylindrical part 12a of the counter gear shaft 12 is enlarged in outer diameter and has an increased thickness. The thick outer peripheral part is provided with five annular circumferential grooves 12cv at regular intervals along the axial direction, and with four axially oriented axial grooves 12av at regular intervals along the circumferential direction.

A plurality of sections are demarcated by the five circumferential grooves 12cv and the four axial grooves 12av, in the outer peripheral part of the central cylindrical part 12a of the counter gear shaft 12. Substantially rectangular recessed parts 12d are formed in some of the plurality of sections.

Each of the annular parts demarcated by the circumferential grooves 12cv is demarcated by the four axial grooves 12av into four sections, of which two diametrically symmetrical ones are provided with the recessed parts 12d, and each of the recessed parts 12d shares a common space with the circumferential groove 12cv at the left side thereof.

As shown in FIG. 12, two recessed parts 12d on the left side in the axial direction and three recessed parts 12d on the right side are arrayed in rows, with a circumferential stagger of 90 degrees therebetween.

The bottom part of each of the circumferential grooves 12cv is provided with radially extending pin holes 12h at four circumferentially spaced-apart locations, and pin members 23 are inserted in the pin holes 12h so that they can radially advance and recede.

The radial pin hole 12h opens in both the inner peripheral surface of the interior of the counter gear shaft 12 and the bottom surface of the circumferential groove 12cv, and the pin member 23 inserted in the pin hole 12h can come into and out of the interior of the counter gear shaft 12 and can advance and recede while projecting into the circumferential groove 12cv.

The first and second cam rods 21 and 22 are in sliding contact with the inner peripheral surface of the counter gear shaft 12. Therefore, when the cam grooves 21v and 22v in the sliding contact surfaces of the first and second cam rods 21 and 22 are moved to such positions as to face the pin holes 12h, the pin members 23 drop into the cam grooves 21v and 22v, so that the amount of projection thereof into the circumferential groove 12cv is reduced. When the sliding surfaces of the first and second cam rods move to such positions as to face the pin holes 12h, the pin members 23 move out of the cam grooves 21v and 22v, so that the amount of projection thereof into the circumferential groove 12cv is increased.

Figure 17:
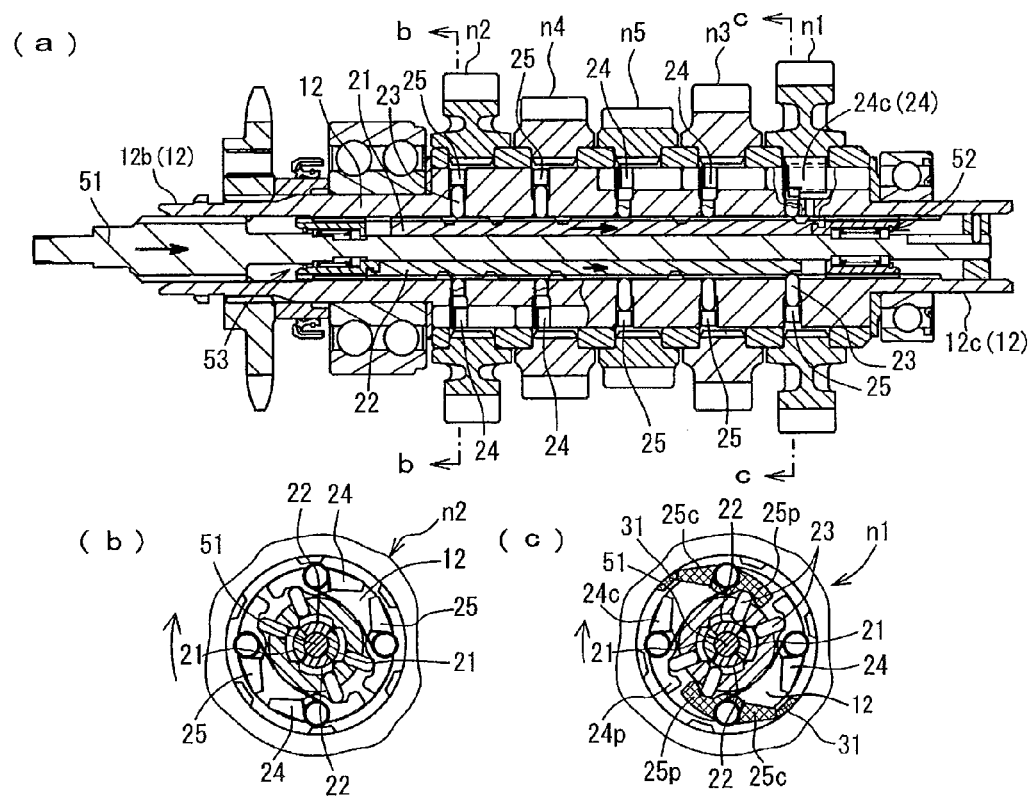
FIG. 17 illustrates a step in the course of the upshift operation.
Figure 18:
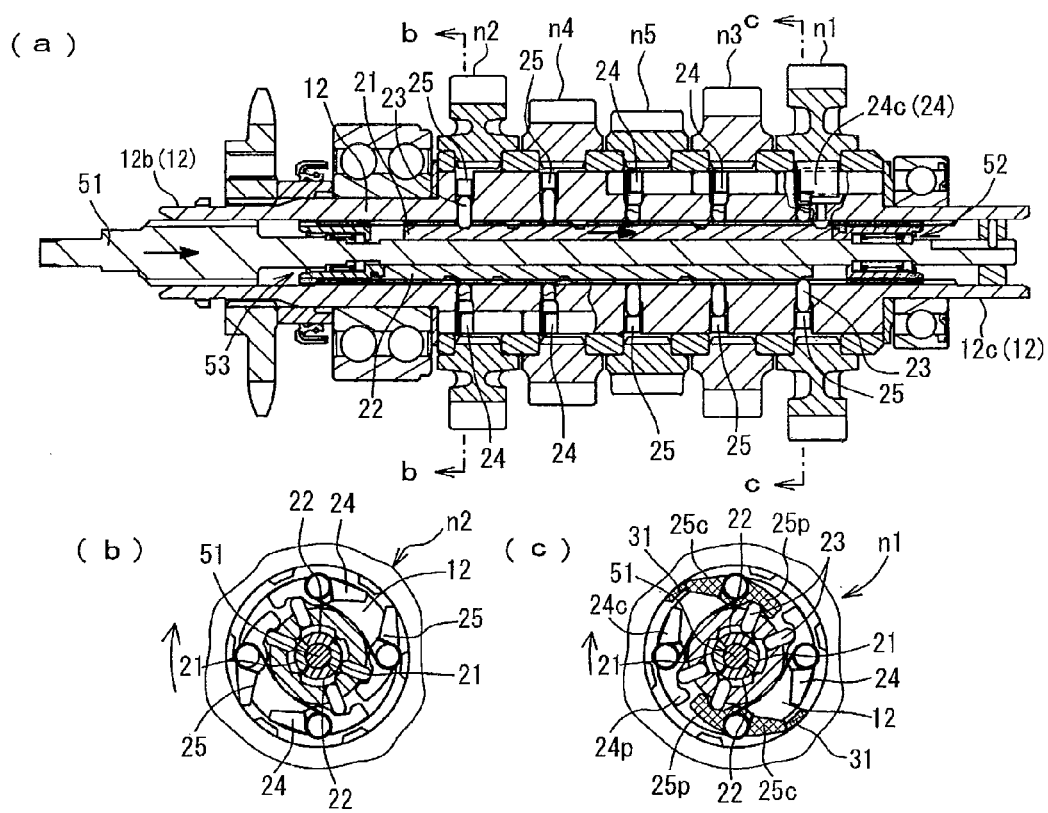
FIG. 18 illustrates a next step.
Figure 19:
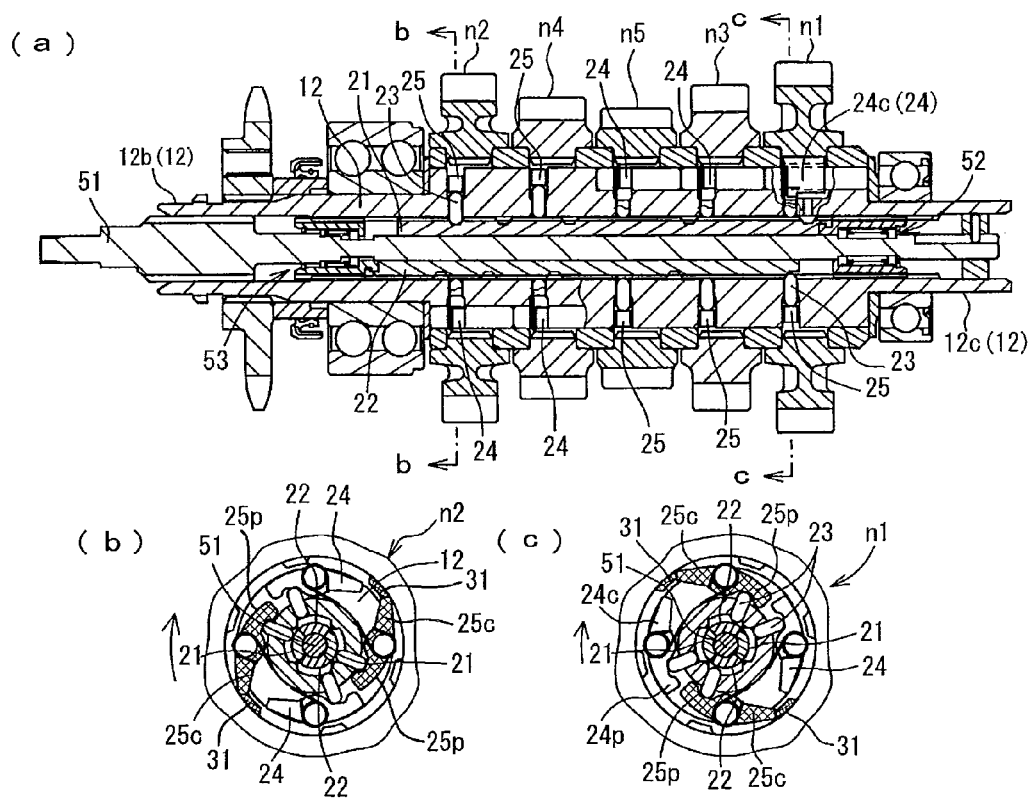
FIG. 19 illustrates a subsequent step.
Figure 20:
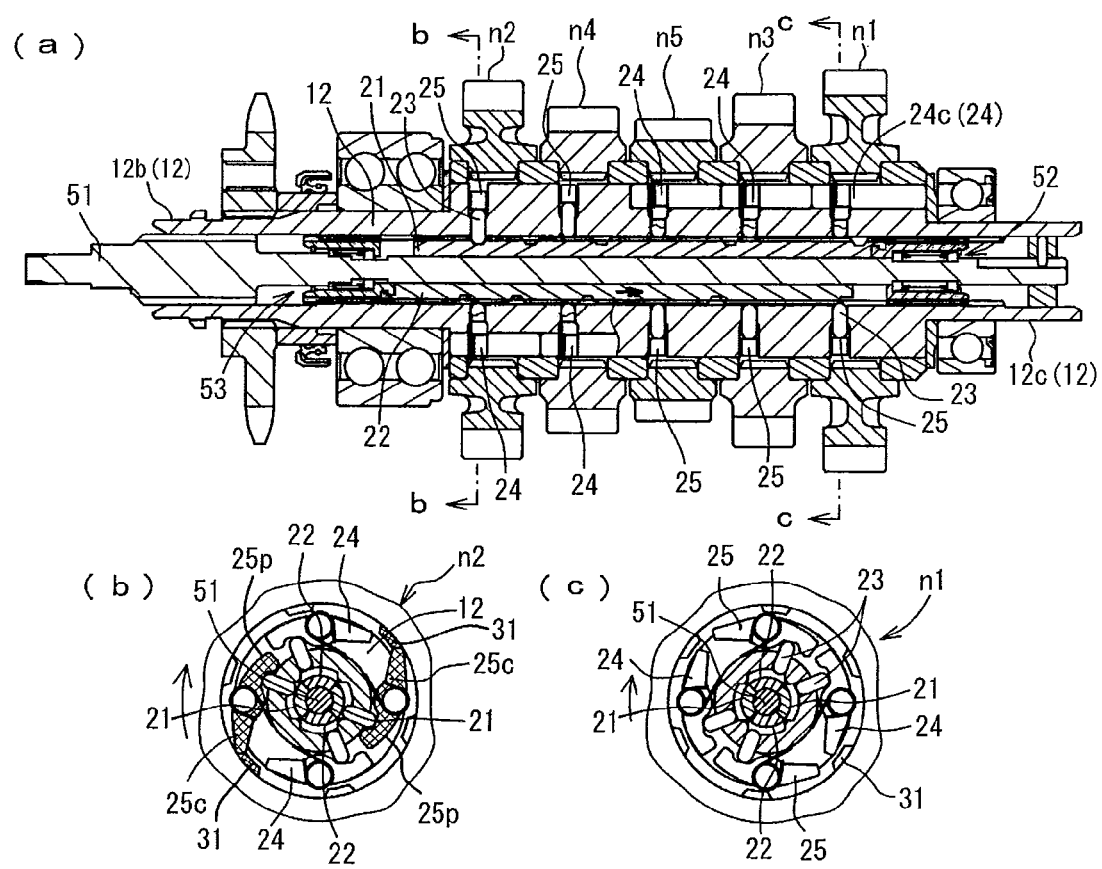
FIG. 20 illustrates a further subsequent step.
Figure 21:
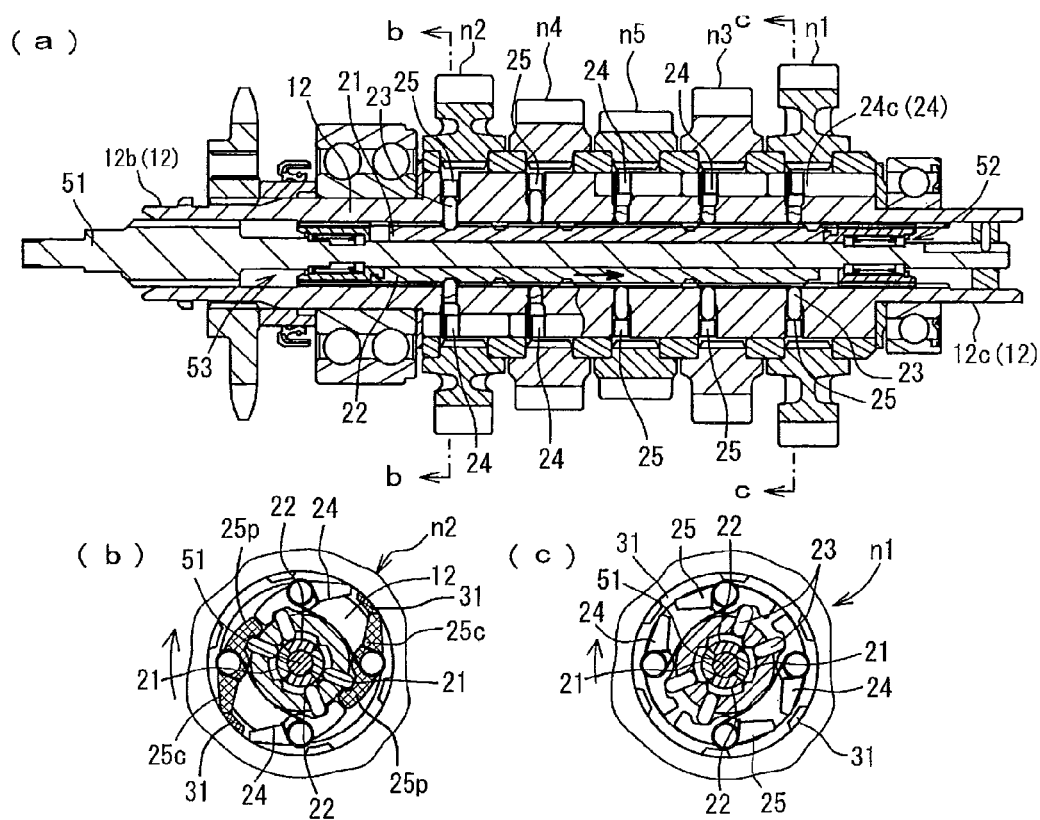
FIG. 21 illustrates a 2nd gear speed condition upon completion of the upshift operation.

As indicated in FIGS. 17 and 18, two kinds of swing pawl members 24 and 25 are put in the recessed parts 12d and the circumferential grooves 12cv in the counter gear shaft 12, and pivot pins 26 for swingably supporting the swing pawl members 24 and 25 are fitted in the axial grooves 12av.

Figure 13:
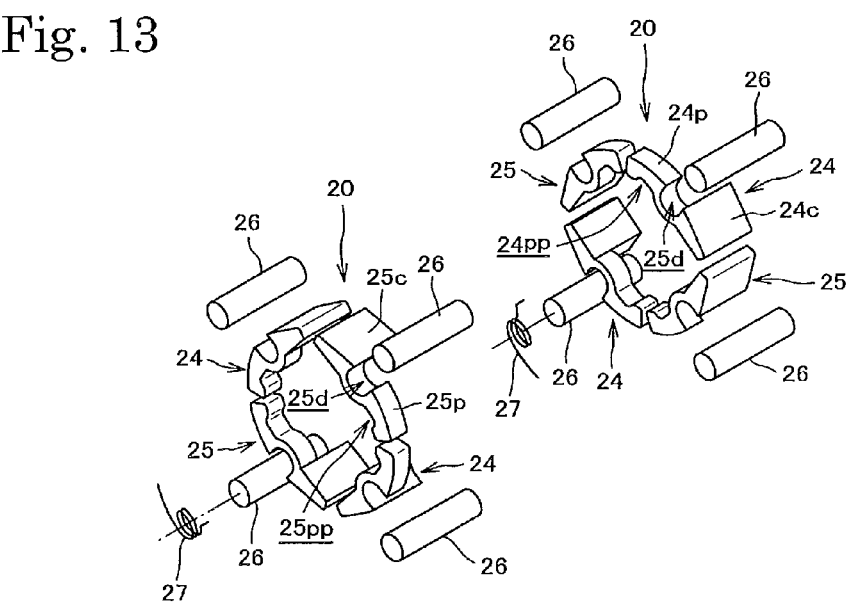
FIG. 13 shows perspective views of swing pawl members and pivot pins.

FIG. 13 shows, in exploded perspective, the four swing pawl members 24, 24 and 25, 25, which are put in the rightmost circumferential groove 12cv and the recessed part 12d on the right side thereof, and the pivot pins 26 therefor, and which are put in the leftmost circumferential groove 12cv and the recessed part 12d on the right side thereof and the pivot pins 26 therefor.

The swing pawl member 24 and 25 are substantially arcuate in shape as viewed in the axial direction, and are provided in their central parts with bearing recessed parts 24d and 25d, respectively, in the form of a through-hole whose outer circumferential part is partly lost, through which the pivot pins 26 are passed, respectively. Pin abutting parts 24p and 25p are extended on one side of the swinging center of the bearing recessed parts 24d and 25d, respectively and engaging claw parts 24c and 25c are extended on the other side.

The pin abutting parts 24p and 25p have a reduced axial width for swingable fit in the circumferential groove 12cv, and are provided in their inner peripheral surfaces with pin receiving recesses 24pp and 25pp for receiving the pin members 24p and 25p, respectively. The engaging claw parts 24c and 25c on the other side have an enlarged axial width for swingable fit in the recessed part 12d, and are formed in a convergent shape as viewed in the axial direction.

The enlarged-width engaging claw parts 24c and 25c are heavier than the reduced-width pin members 24p and 25p, so that they act as a pendulum in turning, so as to swing the swing pawl members 24 and 25 by centrifugal force.

The two kinds of the swing pawl members 24 and 25 are diametrically symmetrical.

The pivot pins 26 are fitted in the bearing recessed parts 24d and 25d so as to swingably support the swing claw members 24 and 25.

The swing pawl members 24 and 25 are put in the recessed parts 12d and the circumferential grooves 12cv in the counter gear shaft 12, while the pivot pins 26 are fitted in the bearing recessed parts 24d and 25d of the swing pawl members 24 and 25 and also fitted and retained in the axial grooves 12av.

Figure 7:
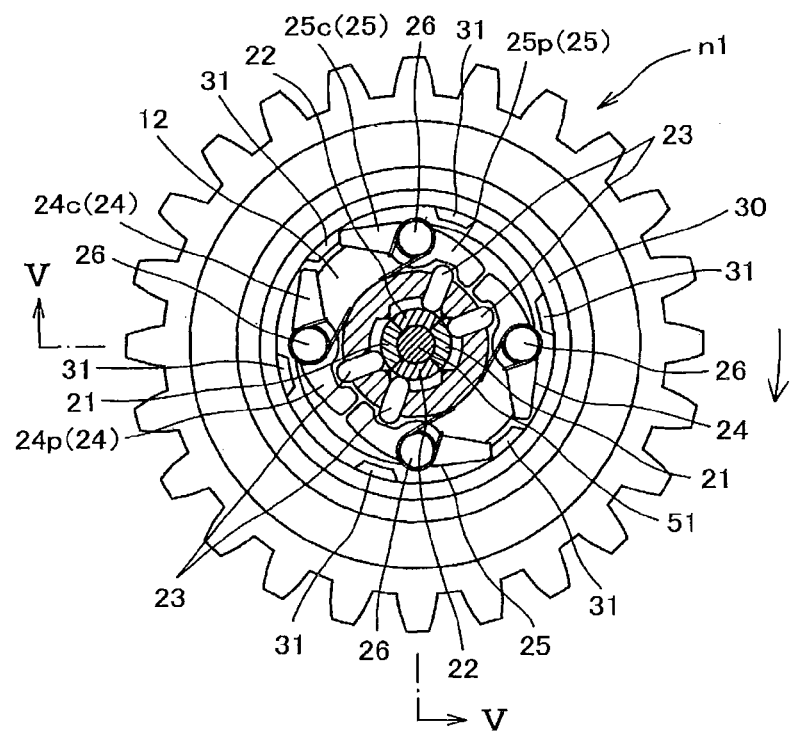
FIG. 7 is a sectional view taken along line VII-VII of FIG. 5.
Figure 8:
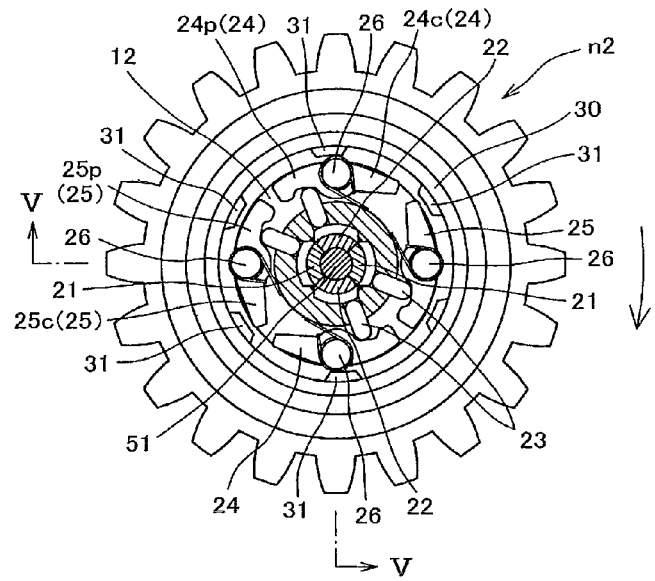
FIG. 8 is a sectional view taken along line VIII-VIII of FIG. 5.

Referring to FIGS. 7 and 8, in each recessed part 12d of the counter gear shaft 12, the swing pawl members 24 and 25 adjacent to each other in the circumferential direction are put such that the tips of the engaging claw parts 24c and 25c thereof are opposite to each other with a predetermined gap therebetween.

As shown in FIG. 13, torsion coil springs 27 are put around the pivot pins 26, respectively. The torsion coil springs 27 are so mounted that one ends of the torsion coil springs 27 are engaged from inside with the engaging claw part 24c and 25c of the swing pawl members 24 and 25, respectively, and the other ends are in contact with the bottom surfaces of the recessed parts 12d, whereby the swing pawl member 24 and 25 are urged so as to swing the engaging claw part 24c and 25c toward the outside.

The pin members 23 act from radially inside to push radially outward the pin abutting parts 24p and 25p on one side of the swing pawl members 24 and 25, and, therefore, the pin members 23 operate to swing the swing pawl member 24 and 25 against the urging forces exerted by the torsion coil springs 27.

Now, the procedure for mounting the above-described engaging means 20 to the counter gear shaft 12 will be described below.

First, as above-mentioned, the lost motion mechanisms 52 and 53 and the four first and second cam rods 21, 21 and 22, 22 are assembled on the peripheral surface of the control rod 51 to obtain the assembled condition as shown in FIG. 11, and the assembly is inserted into the internal hole of the counter gear shaft 12.

In this case, the first and second cam rods 21, 21 and 22, 22 are so positioned as to correspond in circumferential position respectively to the axial grooves 12av in the counter gear shaft 12, and the pin holes 12h are situated to face the sliding contact surfaces of the first and second cam rods 21, 21 and 22, 22 (see FIGS. 7 and 8).

A setting is made such that the moving position in the left-right direction of each of the four first and second cam rods 21, 21 and 22, 22 in relation to the counter gear shaft 12 is in a neutral position.

When the pin members 23 are inserted in the pin holes 12h formed in the circumferential grooves 12cv in the counter gear shaft 12 under this condition, all the pin members 23 abut on the sliding contact surfaces of the first and second cam rods 21, 21 and 22, 22, so that the amount of projection of the pin members 13 from the circumferential grooves 12cv is set to be large.

Then, in the condition where the pivot pins 26 with the torsion coil springs 27 put thereon are fitted in the bearing recessed parts 24d and 25d of the swing pawl members 24 and 25, the swing pawl members 24 and 25 and so on are put in the recesses such as the recessed parts 12d, the circumferential grooves 12cv, the axial grooves 12av, etc. formed in the outer periphery of the counter gear shaft 12.

The swing pawl member 24 and 25 are in such a condition that the pin receiving parts 24p and 25p are pushed up from inside by the largely projecting pin members 23 against the urging forces exerted by the torsion coil springs 27, so as to pull the engaging claw part 24c and 25c inwards. Therefore, as shown in FIG. 14, no components are projecting outwards from the outer peripheral surface of the central cylindrical part 12a of the counter gear shaft 12.

When the pin members 23 drop into the cam groove 21v and 22v in the relevant ones of the first and second cam rods 21 and 22, the swing pawl members 24 and 25 are swung about the pivot pins 26 by the urging forces of the torsion coil springs 27 and the centrifugal forces of the engaging claw parts 24c and 25c heavier than the pin receiving parts 24p and 25p, so that the engaging claw parts 24c and 25c are projected outwards beyond the outer peripheral surface of the central cylindrical part 12a of the counter gear shaft 12.

Figure 14:
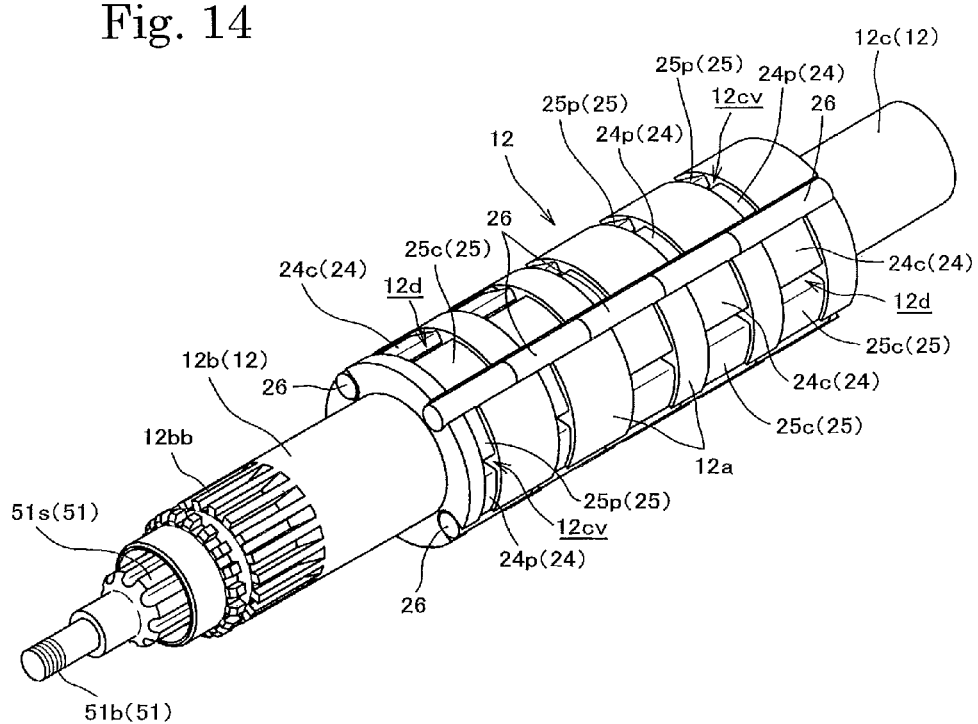
FIG. 14 is a perspective view showing a state in which the swing pawl members, the pivot pins, the cam rods, the control rods and so on are mounted on the counter gear shaft.

In the condition where the engaging means 20 are assembled in the counter gear shaft 12 shown in FIG. 14 and no components protrude outwards beyond the outer peripheral surface of the central cylindrical part 12a, the bearing collar members 13 are sequentially fitted over the assembly.

The bearing collar members 13 are externally fitted on the central cylindrical part 12a at axial positions other than the positions of the recessed parts 12d, and are disposed to bridge axially adjacent ones of the pivot pins 26 fitted in the axial grooves 12av in succession and in a row, thereby preventing the pivot pins 26 and the swing pawl members 24 and 25 from moving out of position.

The pivot pins 26 fitted in the axial grooves 12av in the central cylindrical part 12a of the counter gear shaft 12 have such a size as to be flush with the outer peripheral surface of the central cylindrical part 12a, so that the pivot pins 26 are fixed without any clearance once the bearing collar members 13 are fitted externally.

The six bearing collar members 13 are externally fitted over the counter gear shaft 12 at equal intervals, and the driven transmission gears (n) are rotatably supported thereon in a manner to extend over adjacent one of the bearing collar members 13.

Each driven transmission gear (n) is formed with annular notches at its left and right inner peripheral edge parts, so that an annular protrusion 30 of small height is formed between the left and right notches, and adjacent ones of the bearing collar members 13 are slidably engaged with the annular notches in a manner to grip the protrusion 30 therebetween (see FIGS. 5, 7 and 8).

The protrusion 30 on the inner peripheral surface of each driven transmission gear (n) is formed with engaging projections 31 at six locations at regular intervals along the circumferential direction.

Each engaging projection 31 is arcuate in shape in side view (as viewed in the axial direction in FIGS. 7 and 8), and opposite side edges thereof in the circumferential direction constitute engaging surfaces for engagement with the engaging claw parts 24c and 25c of the swing pawl members 24 and 25.

The swing pawl member 24 and the swing pawl member 25 have their engaging claw parts 24c and 25c in mutually confronting positions, and the swing pawl member 24 is adapted to abut on and be engaged with the engaging projection 31 in the rotational direction of the driven transmission gears (n) (and the counter gear shaft 12), whereas the swing pawl member 25 is adapted to abut on and be engaged with the engaging projection 31 in the counter-rotational direction of the driven transmission gears (n).

Incidentally, the swing pawl member 24 does not engage with the engaging projection 31 in the counter-rotational direction of the driven transmission gears (n) even if its engaging claw part 24c is projecting outwards. Similarly, the swing pawl member 25 does not engage with the engaging projection 31 in the rotational direction of the driven transmission gears (n) even if its engaging claw part 25c is projecting outwards.

In practice, the process of assembling the engaging means 20 and the like into the counter gear shaft 12 and mounting the five driven transmission gears (n) is carried out as follows.

First, the control rod 51, the cam rods 21 and 22 and the lost motion mechanisms 52 and 53 assembled together in the state shown in FIG. 11 are inserted into the counter gear shaft 12 as above-mentioned, while the pin members 23 are preliminarily inserted in the pin holes 12h. This assembly is then erected with the left portion upward.

Figure 15:
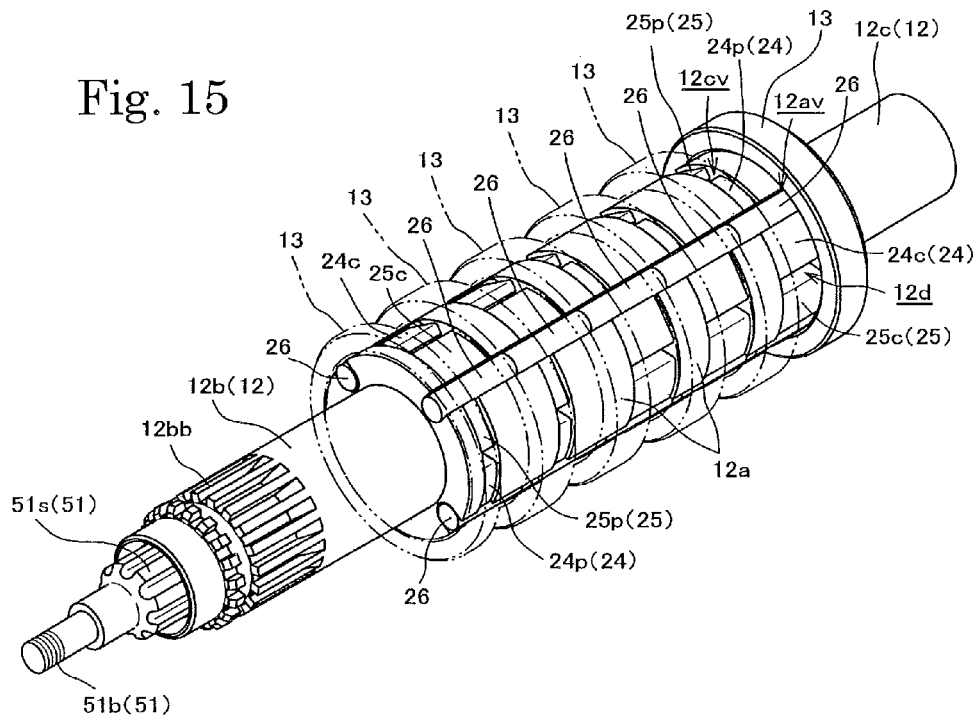
FIG. 15 is a perspective view showing a state in which one bearing collar member has been externally fitted over the counter gear shaft in the state shown in FIG. 14.

Then, first, the right-end bearing collar member 13 is fitted over the lower end (right end) of the central cylindrical part 12a as indicated by solid lines in FIG. 15, and the engaging means 20 (the swing pawl members 24, 25, the pivot pins 26, and the torsion coil springs 27) for the 1st driven transmission gear n1 is inserted into position. Next, the 1st driven transmission gear n1 is fitted over from above to be mounted into position so that the protrusion 30 of the 1st driven transmission gear n1 abuts on the bearing collar member 13 and the notch is engaged with the bearing collar member 13. Thereafter, the second bearing collar member 13 is fitted over from above to be engaged with the notch of the 1st driven transmission gear n1, whereby the second bearing collar member 13 is externally mounted in position on the counter gear shaft 12 and the 1st driven transmission gear n1 is supported in position in the axial direction.

Next, the engaging means 20 for the 3rd driven transmission gear n3 is inserted in position, the 3rd driven transmission gear n3 is mounted in position, and, then such procedure is repeated to sequentially mount the remaining 5th, 4th, and 2nd driven transmission gears n5, n4, n2 in respective positions, followed finally by externally mounting the sixth bearing collar member 13.

In the condition where the five driven transmission gears (n) are thus mounted on the counter gear shaft 12, the counter gear shaft 12 is rotatably supported in the left and right bearings 7L and 7R attached to the side walls of the left engine case 1L and the right engine case 1R in the manner of being clamped therebetween through the collar members 14L and 14R, as shown in FIG. 1. As a result, the five driven transmission gears (n) and the six bearing collar members 13 are clamped from the left and right sides in an alternately arranged state and are axially positioned correctly.

The bearing collar members 13 can bear the axial forces concerning the driven transmission gears (n), and can therefore ensure positioning of the driven transmission gears (n) in the axial direction and bear thrust forces therefrom.

In this manner, the 1st, 3rd, 5th, 4th, and 2nd driven transmission gears n1, n3, n5, n4, n2 are rotatably supported on the counter gear shaft 12 through the bearing collar members 13.

Since the first and second cam rods 21 and 22 are each in the neutral position, all the driven transmission gears (n) are in a disengaged condition in which, due to the moving positions of the first and second cam rods 21 and 22 of the corresponding engaging means 20, the pin members 23 are projected to push up from inside the pin abutting parts 24p and 25p of the swing pawl members 24 and 25 and to allow the engaging claw parts 24c and 25c to swing inwards; and thus, all the driven transmission gears (n) are freely rotatable in relation to the counter gear shaft 12.

On the other hand, in an engaged condition in which, due to the moving positions of the cam rods 21 and 22 of the engaging means 20, other than the neutral positions, the pin members 23 enter the cam grooves 21v and 22v and the swing pawl members 24 and 25 are swung so that the engaging claw parts 24c and 25c are projected outwards, and the engaging projections 31 of the relevant driven transmission gear (n) abut against the engaging claw parts 24c and 25c. As a result, the rotation of the relevant driven transmission gear (n) is transmitted to the counter gear shaft 12, or the rotation of the counter gear shaft 12 is transmitted to the relevant driven transmission gear (n).

When the gear shift driving motor 60 of the above-mentioned gear shift driving means 50 is driven and the Geneva driving gear 62 is rotated by one revolution, the shift drum 65 is rotated by 60 degrees by the ⅙-revolution Geneva stop mechanism, and the guide pin 76 engaged with the guide groove 65v in the shift drum 65 is guided to move the control rod operating element 70, which is integral with the guide pin 76, by a predetermined amount in the axial direction.

The control rod operating element 70 moves the control rod 51 together by the predetermined amount in the axial direction through the two ball bearings 71. The movement of the control rod 51 in the axial direction moves, in conjunction, the first and second cam rods 21 and 22 in the axial direction through the springs 52s and 53s of the lost motion mechanisms 52 and 53.

With the first and second cam rods 21 and 22 thus moved in the axial direction, the pin members 23 in sliding contact with the first and second cam rods 21 and 22 in the engaging means 20 move into or out of the cam grooves 21v and 22v to swing the swing pawl members 24 and 25 so that the latter are disengaged from one driven transmission gear (n) and engaged with another driven transmission gear (n), whereby the driven transmission gear (n) engaged with the counter gear shaft 12 is changed over, i.e., a gear shift is achieved.

While the gear shift driving motor 60 to make gear shifts is used as the gear shift driving means, a mechanism may be adopted in which the driver operates a gear shift lever or the like to advance or retreat a cable, whereby the shift drum is rotated through the function of a Geneva stop mechanism or the like, thereby achieving a gear shift.

Now, the process of an upshift from the 1st gear speed condition to the 2nd gear speed condition, which is one step lower in reduction gear ratio than the 1st gear speed condition, at the time of acceleration by driving the internal combustion engine will be described below, referring to FIGS. 16 to 21.

FIGS. 16 to 21 illustrate changes with time, and in each of the figures, (a) is a sectional view showing the structure of the counter gear shaft 12 and the surrounding elements therefor, (b) is a sectional view (sectional view of 2nd driven transmission gear n2) taken along line b-b of (a), and (c) is a sectional view (sectional view of the 1st driven transmission gear n1) taken along line c-c of (a).

The motive power of the internal combustion engine is transmitted through the frictional clutch 5 to the main gear shaft 11, whereby the 1st, 3rd, 5th, 4th, and 2nd drive transmission gears m1, m3, m5, m4, m2 are rotated as one body, and the 1st, 3rd, 5th, 4th, and 2nd driven transmission gears n1, n3, n5, n4, n2 constantly meshed respectively with them are thereby rotated at respective rotational speeds.

Figure 16:
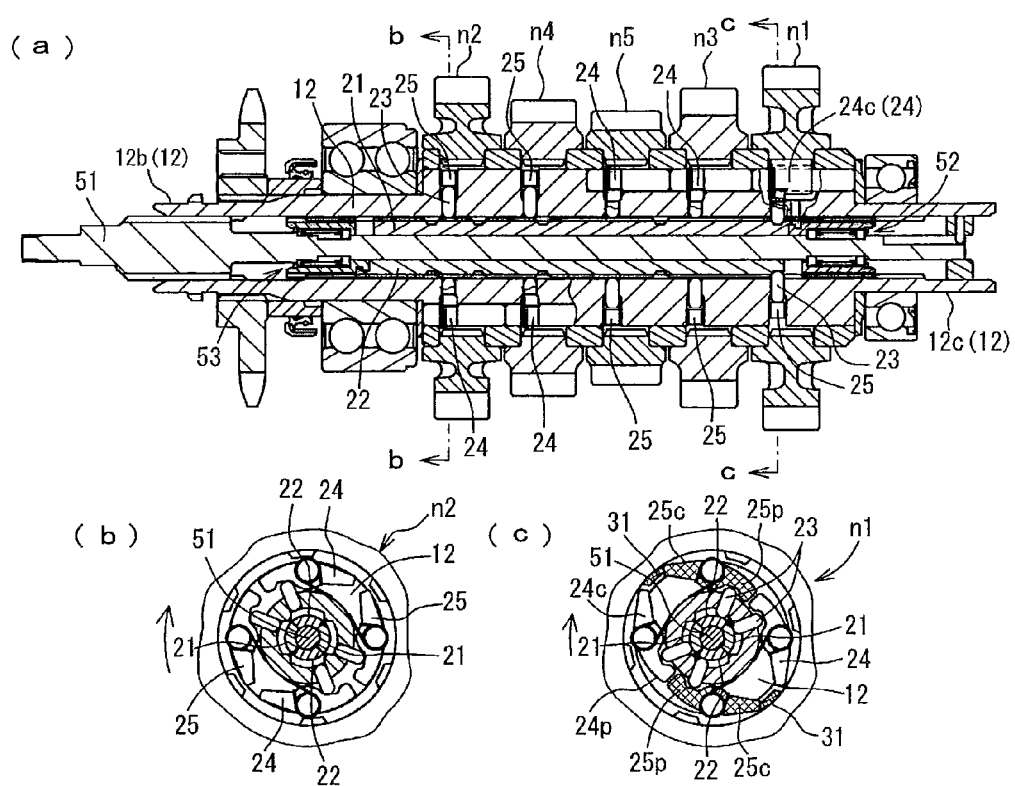
FIG. 16 illustrates a 1st gear speed condition at the time of starting an upshift.

FIG. 16 illustrates the 1st gear speed condition. In FIG. 16(b), the 2nd driven transmission gear n2 is being rotated in the direction of the arrow, and, in FIG. 16(c), the 1st driven transmission gear n1 is rotated in the direction of the arrow. In this case, the 2nd driven transmission gear n2 is rotated at a higher speed than the 1st driven transmission gear n1.

Only the pin members 23 of the engaging means 20 corresponding to the 1st driven transmission gear n1 are engaged in the cam grooves 21v and 22v of the first and second cam rods 21 and 22, so that the swing pawl members 24 and 25 of this engaging means 20 are caused to project their engaging pawl parts 24c and 25c radially outwards, and the engaging projections 31 of the 1st driven transmission gear n1 being rotated are engaged with the engaging claw parts 25c of the swing pawl members 25 (see FIG. 16(c)), whereby the counter gear shaft 12 is rotated together with the 1st driven transmission gear n1 at the same rotational speed as that of the 1st driven transmission gear n1.

In FIGS. 16 to 24, the swing pawl members 24 and 25 and the engaging projections 31 which are effectively transmitting motive power are cross-hatched.

In this 1st gear speed condition, the pin members 23 of the engaging means 20 corresponding to the 2nd driven transmission gear n2 have moved out of the cam grooves 21v and 22v of the first and second cam rods 21 and 22 to project outwards, and the swing pawl members 24 and 25 of this engaging means 20 are caused to retreat their engaging claw parts 24c and 25c inwards, so that the 2nd driven transmission gear n2 is in idle rotation.

The other, 3rd, 4th and 5th driven transmission gears n3, n4, n5 are similarly in idle rotation (see FIG. 16(b)).

When the gear shift driving motor 60 is operated to make a gear shift into the 2nd gear speed and the control rod operating element 70 is moved rightward in the axial direction, the control rod operating element 70 operates to move the first and second cam rods 21 and 22 rightward in the axial direction through the springs 52s and 53s of the lost motion mechanisms 52 and 53.

Referring to FIG. 17, with regard to the first cam rod 21, the swing pawl members 24 operated through the pin members 23 are not in engagement with the engaging projections 31 of the 1st driven transmission gear n1, and the first cam rods 21 are therefore moved with little resistance, so as to cause the pin members 23 having been engaged in the cam grooves 21v to move out of the cam grooves 21v and project outwards, whereby the swing pawl members 24 are swung and the engaging claw parts 24c are retreated inwards (see FIG. 17(c)).

With regard to the second cam rods 22 on the other hand, the swing pawl members 25 operated through the pin members 23 are in engagement with the engaging projections 31 of the 1st driven transmission gear n1 and are receiving motive power from the 1st driven transmission gear n1, so that a considerably great frictional resistance is exerted in swinging the swing pawl members 25 for disengaging the latter. Therefore, even if the second cam rods 22 are moved by the force of the spring 53s of the lost motion mechanism 53 to urge the pin members 23 to project outwards along the inclined side surfaces of the cam grooves 22v, it is impossible to push up and swing the swing pawl members 25. As a result, the cam rods 22 are stopped in a state in which the pin members 23 are about to move outwards along the inclined side surfaces of the cam grooves 22v, and the engagement is kept unreleased (see FIG. 17(c)).

With regard to the 2nd driven transmission gear n2, in the condition shown in FIG. 17, the pin members 23 are not engaged in the cam grooves 21v in the first cam rods 21, so that the swing pawl members 25 show no changes, and the swing pawl members 24 also show no change because the second cam rods 22 are at rest (see FIG. 17(b)).

When the control rod operating element 70 is moved further rightwards under the condition where the second cam rods 22 are at rest, the first cam rods 21 are also moved rightwards. As a result, referring to FIG. 18, with regard to the 1st driven transmission gear n1, the pin members 23 move out of the cam grooves 21v of the first cam rods 21 and project outwards so as to swing the swing pawl members 24 to retreat the engaging claw parts 24c fully to the inner side (see FIG. 18(c)). With regard to the 2nd driven transmission gear n2, the pin members 23 enter the cam grooves 21v of the first cam rods 21, and the swing pawl members 25 are swung by the urging forces of the torsion coil springs 27 and the centrifugal forces of their engaging claw parts 25c, to project the engaging claw parts 25c outwards (see FIG. 18(b)).

Then, the engaging projections 31 of the 2nd driven transmission gear n2, which are being rotated at a higher speed than the counter gear shaft 12 rotated together with the 1st driven transmission gear n1, catch up with and abut on the outwardly projected engaging claw parts 25c of the swing pawl members 25 (see FIG. 19(b)).

In this instance, referring to FIGS. 19(b) and 19(c), there is a moment that the engaging projections 31 of the 2nd driven transmission gear n2 and the engaging projections 31 of the 1st driven transmission gear n2 are simultaneously abutted on the engaging claw parts 25c and 25c of the respective swing pawl members 25 and 25.

Therefore, immediately after this moment, the counter gear shaft 12 is caused to start rotation at the same rotational speed as that of the 2nd driven transmission gear n2, by the 2nd driven transmission gear n2 rotating at a higher speed (see FIG. 20(b)), while the engaging claw parts 25c of the swing pawl members 25 are separated from the engaging projections 31 of the 1st driven transmission gear n1 (see FIG. 20(c)), whereby a practical upshift from the 1st gear speed to the 2nd gear speed is carried out.

While the movement of the control rod operating element 70 ends at this point, the gear shift operation continues further. With the engaging claw parts 25c of the swing pawl members 25 separated from the engaging projections 31 of the 1st driven transmission gear n1, the frictional resistance fixing the swing pawl members 25 is eliminated. Consequently, the second cam rods 22 having been urged by the spring 53s of the lost motion mechanism 53 are moved rightwards, and the pin members 23 having been engaged with the cam grooves 22v begin to move out of the cam grooves 22v to swing the swing pawl members 25, thereby retreating the engaging claw parts 25c inwards (see FIG. 20(c)).

Then, with the second cam rods 22 moved further rightwards, the pin members 23 for the 1st driven transmission gear n1 move out of the cam grooves 22v, so that the engaging claw parts 25c of the swing pawl members 25 are completely retreated to the inner side (see FIG. 21(c)). Further, with regard to the 2nd driven transmission gear n2, the pin members 23 enter the cam groove 22v, and the swing pawl members 24 are swung by the urging forces of the torsion coil springs 27 and the centrifugal forces of their engaging claw parts 24c, to project the engaging claw parts 24c outwards (see FIG. 21(b)).

In this condition, the gear shift operation from the 1st gear speed to the 2nd gear speed is completed.

The process of the upshift from the 1st gear speed condition to the 2nd gear speed condition, which is one step lower in reduction ratio than the 1st gear speed condition, is carried out as above. That is, in the condition shown in FIG. 19 where the engaging projections 31 of the 1st driven transmission gear n1 are in abutment on and in engagement with the engaging claw parts 25c of the swing pawl members 25 so that the counter gear shaft 12 is being rotated at the same speed as the first driven transmission gear n1, the engaging projections 31 of the 2nd driven transmission gear n2 rotating at a higher speed catch up with and abut on the engaging claw parts 25c of the swing pawl members 25, whereby the counter gear shaft 12 is rotated at a higher speed together with the 2nd driven transmission gear n2, and the gear shift is achieved. Therefore, the engaging claw parts 25c of the swing pawl members 25 are easily separated from the engaging projections 31 of the 1st driven transmission gear n1, and the engagement is thereby released smoothly. Accordingly, no force is needed to release the engagement, and a smooth operation and a smooth upshift can be achieved.

Similarly, an upshift from the 2nd to the 3rd gear speed, an upshift from the 3rd to the 4th gear speed, and an upshift from the 4th to the 5th gear speed can also be performed smoothly. Specifically, in these upshifts, in the condition where one driven transmission gear (n) is in engagement with the swing pawl members 24, another driven transmission gear (n) which is one step lower in reduction ratio than the one driven transmission gear (n) is engaged with the swing pawl members 24, to make the upshift. Therefore, no force is needed to release the engagement, smooth operations are ensured, and there is no need for a clutch for gear shift. In addition, there is utterly no loss in changeover time at the time of making an upshift, a loss of the driving force is avoided, the shift shock is small, and a smooth upshift can be achieved.

For example, in the 1st gear speed condition, as shown in FIG. 16(c), the swing pawl members 25 are in engagement with the engaging projections 31 of the 1st driven transmission gear n1, and, simultaneously, the engaging claw parts 24c of the swing pawl members 24 are in an engageable state in the proximity of the engaging projections 31.

Therefore, when due to vehicle deceleration a driving force is applied from the rear wheel to the counter gear shaft 12 and the direction of the driving force is thus changed, the engagement of the engaging projections 31 of the 1st driven transmission gear n1 is speedily switched from the engagement with the swing pawl members 25 to the engagement with the swing pawl members 24, whereby the engagement can be smoothly taken over and maintained.

Besides, in the case of the upshift from the 1st to the 2nd gear speed, the engaging claw parts 24c of the swing pawl members 24 for the 1st driven transmission gear n1 are retreated inwards from the engageable state before the engaging projections 31 of the 2nd driven transmission gear n2 are engaged with the swing pawl members 25. Therefore, these swing pawl members 24 do not obstruct the gear shift (see FIG. 19(c)), and smooth and reliable engagement and disengagement are performed.

Figure 23:
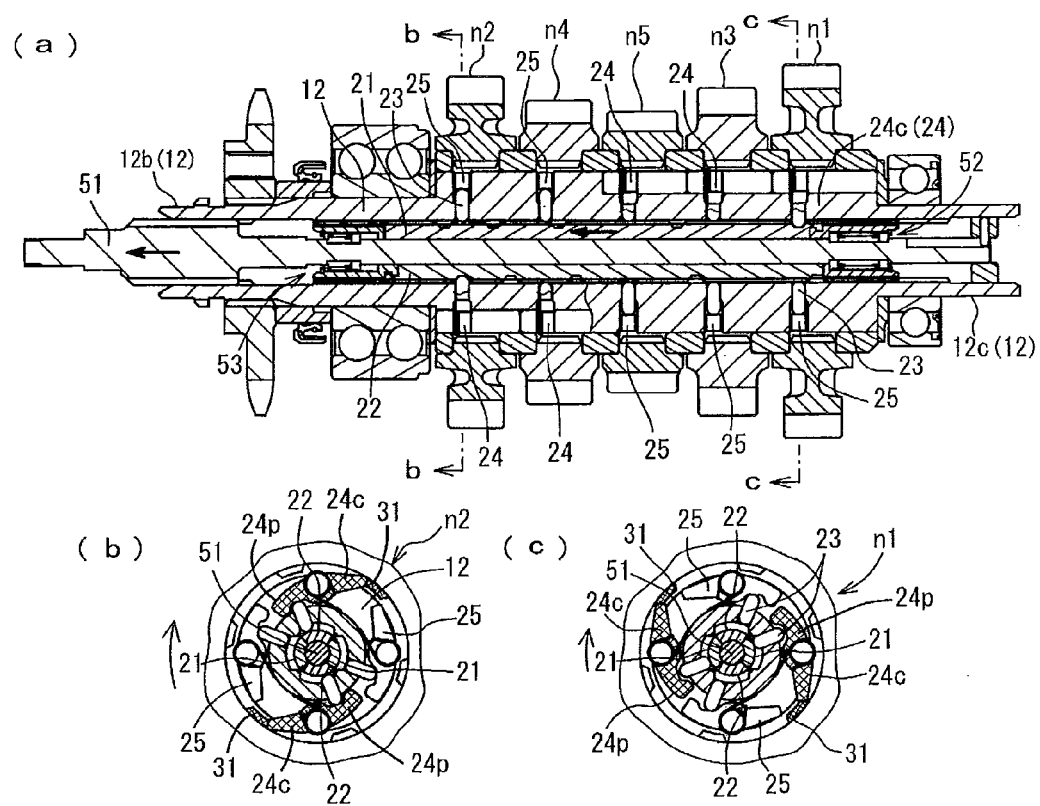
FIG. 23 illustrates a step in the course of the downshift operation.
Figure 24:
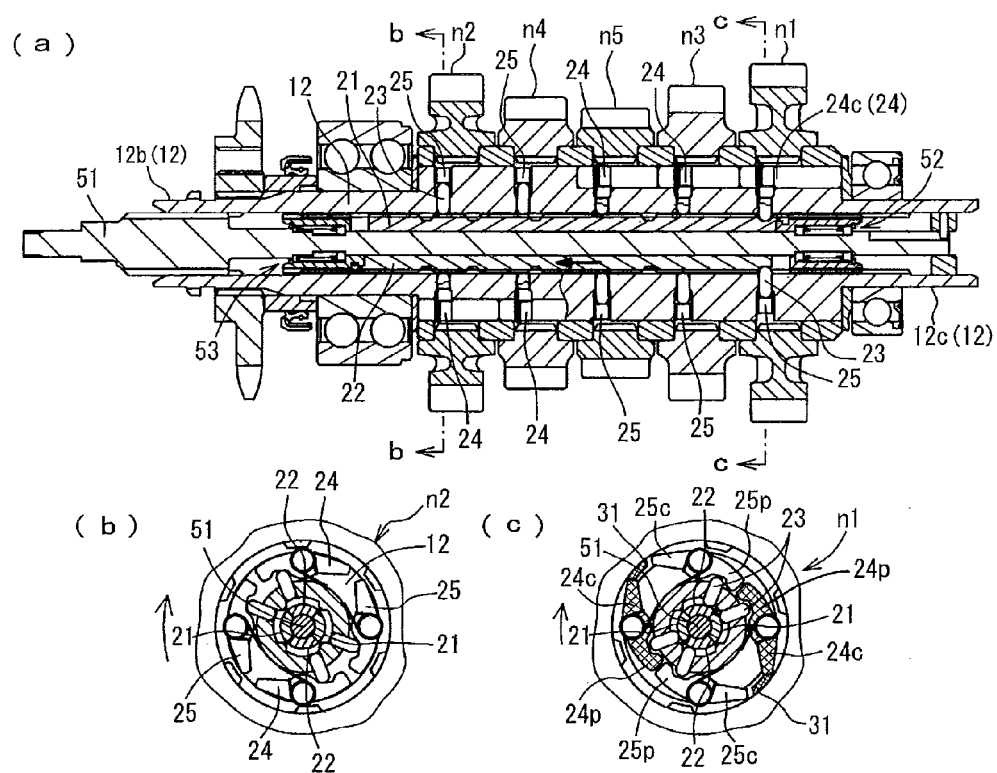
FIG. 24 illustrates the 1st gear speed condition upon completion of the downshift.

Now, the process of a downshift from the 2nd gear speed condition to the 1st gear speed condition, which is one step higher in reduction ratio than the 2nd gear speed condition at the time of vehicle deceleration, will be described below with reference to FIGS. 22 to 24.

Figure 22:
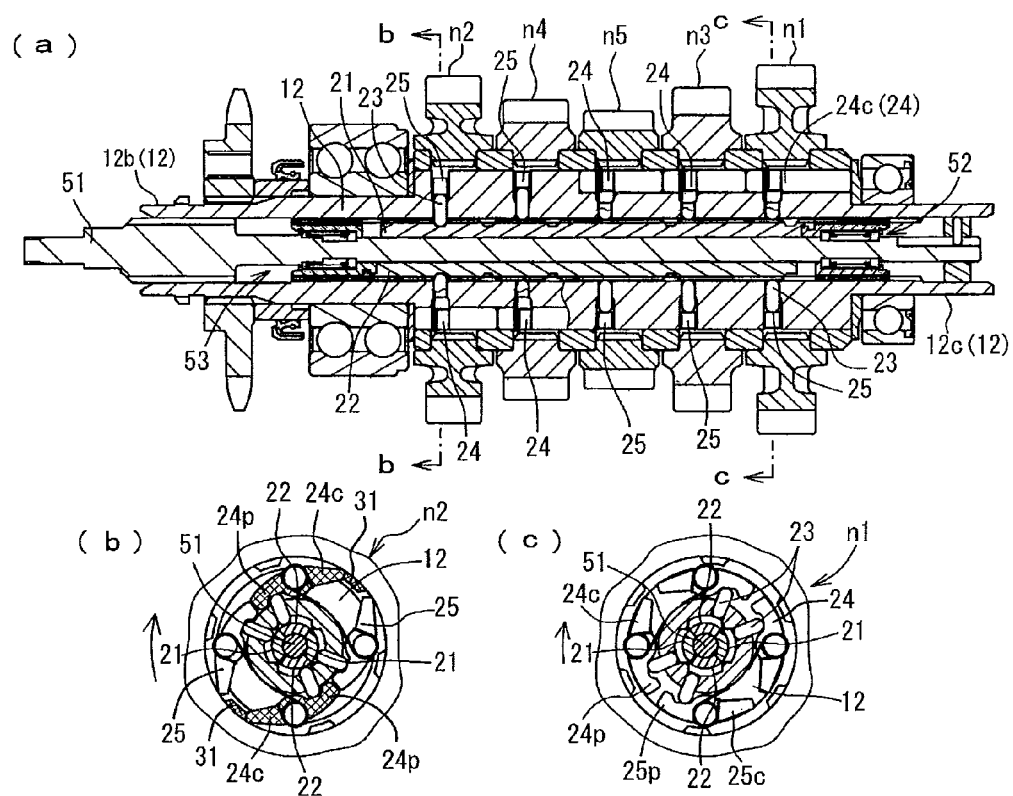
FIG. 22 illustrates the 2nd gear speed condition at the time of starting a downshift.

FIG. 22 illustrates a condition immediately after deceleration from the 2nd gear speed condition.

Due to the deceleration, a driving force is applied from the rear wheel to the counter gear shaft 12. Consequently, as shown in FIG. 22(b), the engaging claw parts 24c of the swing pawl members 24 which have been in an engageable state move into engagement with the engaging projections 31 of the 2nd driven transmission gear n2 lowered in rotational speed, so that the rotating power of the counter gear shaft 12 is transmitted to the 2nd driven transmission gear n2. In other words, the so-called engine brake is being applied.

When the control rod operating element 70 is moved leftwards in the axial direction by driving of the gear shift driving motor 60 for the purpose of making a downshift to the 1st gear speed under this condition, the control rod operating element 70 urges the first and second cam rods 21 and 22 to move leftwards in the axial direction through the springs 52s and 53s of the lost motion mechanisms 52 and 53. However, the second cam rods 22 are receiving motive power from the 2nd driven transmission gear n2 because the swing pawl members 24 operated through the pin members 23 are in engagement with the engaging projections 31 of the 2nd driven transmission gear n2, so that there is a considerably large frictional resistance in swinging the swing pawl members 24 so as to disengage the latter. Therefore, the second cam rods 22 are stopped at the moment that the pin members 23 are about to move outwards along the inclined side surfaces of the cam grooves 22v, so that the engagement of these swing pawl members 24 is left unreleased.

On the other hand, since the swing pawl members 25 operated through the pin members 23 are not in engagement with the engaging projections 31 of the 2nd driven transmission gear n2, the first cam rods 21 are moved leftwards with little resistance so that the pin members 23 having been engaged with the cam grooves 21v of the first cam rods 21 are moved out of the cam grooves 21v and project outwards to swing the swing pawl members 25, thereby retreating the engaging claw parts 25c inwards (see FIG. 23(b)).

Besides, in relation to the 1st driven transmission gear n1, the leftward movement of the first cam rods 21 causes the pin members 23 to enter the cam grooves 21v of the first cam rods 21, so that the swing pawl members 24 are swung by the urging forces of the torsion coil springs 27 and by the centrifugal forces of their engaging claw parts 24c, so as to project the engaging claw parts 24c outwards (see FIG. 23(c)).

Then, when the swing pawl members 24 are rotated together with the counter gear shaft 12 to catch up with and abut on the engaging projections 31 of the 1st driven transmission gear n1, there is a moment that the engaging projections 31 of the 2nd driven transmission gear n2 and the engaging projections 31 of the 1st driven transmission gear n1 are simultaneously abutted on the engaging projections 24c and 25c of the respective swing pawl members 24 and 25, as shown in FIGS. 23(b) and 23(c).

Immediately after this moment and then on, the engagement with the 1st driven transmission gear n1 rotated at a lower speed becomes effective, while the engagement with the 2nd driven transmission gear n2 is released, whereby the downshift from the 2nd to the 1st gear speed is performed.

While the movement of the control rod operating element 70 ends at this point, the gear shift operation continues further. With the engagement of the engaging projections 31 of the 2nd driven transmission gear n2 with the swing pawl members 24 released, the frictional resistance fixing the swing pawl members 24 is eliminated. As a result, the second cam rods 22 having been urged by the spring 53s of the lost motion mechanism 53 are moved leftwards, and the pin members 23 associated with the 2nd driven transmission gear n2 and having been engaged with the cam groove 22v move out of the cam grooves 22v to swing the swing pawl member 24, thereby retreating the engaging claw parts 24c inwards (see FIG. 24(b)). Besides, in the 1st driven transmission gear n1, the pin members 23 enter the cam grooves 22v, and the swing pawl members 25 are swung by the urging forces of the torsion coil springs 27 and the centrifugal forces of their engaging claw parts 25c, to project the engaging claw parts 25c outwards (see FIG. 24(c)).

In this condition, the gear shift operation from the 1st to the 2nd gear speed is completed.

The process of the downshift from the 2nd gear speed condition to the 1st gear speed condition, which is one step higher in reduction ratio than the 2nd gear speed condition, includes the following operation. That is, in the condition where the engaging claw parts 24c of the swing pawl members 24 are in abutment on and in engagement with the engaging projections 31 of the 2nd driven transmission gear n2, as shown in FIG. 23, the engaging claw parts 24c of the swing pawl members 24 catch up with and abut on the engaging projections 31 of the 1st driven transmission gear n1 rotating at a lower speed, whereby the engagement is changed over. Therefore, the engagement of the engaging projections 31 of the 2nd driven transmission gear n2 with the engaging claw parts 24c of the swing pawl members 24 is released smoothly. Accordingly, no force is needed to release the engagement, a smooth operation is ensured, and a smooth downshift can be achieved.

A downshift from the 5th to the 4th gear speed, a downshift from the 4th to the 3rd gear speed, and a downshift from the 3rd to the 2nd gear speed can also be performed smoothly. Specifically, in these downshifts, in the condition where one driven transmission gear (n) is in engagement with the swing pawl members 24, another driven transmission gear (n) which is one step higher in reduction ratio than the one driven transmission gear (n) is engaged with the swing pawl members 24, to make the downshift. Therefore, no force is needed to release the engagement, a smooth operation is ensured, and there is not need for a clutch for gear shift. In addition, there is utterly no loss in changeover time for making a downshift, a loss of the driving force is avoided, the shift shock is small, and a smooth downshift can be achieved.

For example, in the 2nd gear speed condition, as shown in FIG. 22(b), the swing pawl members 24 are in engagement with the engaging projections 31 of the 2nd driven transmission gear n2, and, simultaneously, the engaging claw parts 25c of the swing pawl members 25 are in an engageable state in the proximity of the engaging projections 31.

Therefore, when, due to vehicle acceleration, a driving force is applied from the internal combustion engine to the 2nd driven transmission gear n2 and the direction of the driving force is changed, the engagement of the engaging projections 31 of the 2nd driven transmission gear n2 is promptly switched from the engagement with the swing pawl members 24 to the engagement with the swing pawl members 25, whereby the engagement can be smoothly taken over and maintained.

Besides, in the case of the downshift from the 2nd to the 1st gear speed, the engaging claw parts 25c of the swing pawl members 25 for the 2nd driven transmission gear n2 are retreated inwards from the engageable state before the swing pawl members 24 are engaged with the engaging projections 31 of the 1st driven transmission gear n1. Therefore, these swing pawl members 25 do not obstruct the gear shift (see FIG. 23(b)), and smooth and reliable engagement and disengagement are performed.

The control rod 51 of the gear shift driving mechanism 50 and the counter gear shaft 12 in the present multi-stage transmission 10, are in mutual spline engagement at the spline teeth 51ss and the spline teeth 12ss, at the left side, while, at the right side, relative rotation therebetween is inhibited by an anti-rotation mechanism in which the engaging pin 55 is engaged with the engaging groove 51v. Therefore, the control rod 51 is rotated together with the counter gear shaft 12. Besides, the first and second cam rods 21 and 22 therebetween are also rotated together with the counter gear shaft 12 due to the serration fit therebetween. Consequently, friction loss between the control rod 51 and the first and second cam rods 21 and 22 and between the first and second cam rods 21 and 22 the counter gear shaft 12 can be reduced.

Further, it is not necessary to provide bearings in the small spaces between the inside surfaces of the first and second cam rods 21 and 22 and the control rod 51. Instead, at that portion of the control rod 51 which projects to the exterior of the counter gear shaft 12 and at which a space is available, the comparatively large-sized inexpensive ball bearings 71 can be provided between that portion and the control rod operating element 70.

As an anti-rotation mechanism for inhibiting relative rotation between the control rod 51 and the counter gear shaft 12, the end part of the counter gear shaft 12 and the control rod 51 are spline-fitted through the spline teeth 12ss and the spline teeth 51ss. In utilizing the spline fit, some of the spline teeth 12ss are eliminated, to form the lubricating oil passages 51o.

As shown in FIG. 1, the gear shift driving chamber 82 of the gear shift driving means 50, accommodating the Geneva stop mechanism 62, 63, the shift drum 65 and the like, is supplied with a lubricating oil from the upper side. The lubricating oil having lubricated various required parts reaches the control rod 51 located on the lower side, and flows through the lubricating oil passages 51o formed by omitting some of the spline teeth 12ss between the control rod 51 and the counter gear shaft 12 into the inner hole of the counter gear shaft 12. In the inner hole, the lubricating oil is supplied to sliding contact portions of the lost motion mechanisms 52 and 53, the first and second cam rods 21, 21 and 22, 22 and the pin members 23. In this manner, the required lubrication can be performed easily.

Thus, since the spline fit between the control rod 51 and the counter gear shaft 12 is utilized and some of the spline teeth 12ss are removed to thereby form the lubricating oil passages 51o, the spline fit functions both as an anti-rotation mechanism against relative rotation between the control rod 51 and the counter gear shaft 12 and as the lubricating oil passage for supplying the lubricating oil to the first and second cam rods 21 and 22 and so on in the counter gear shaft 12. Consequently, a reduction in the number of component parts and a reduction in the number of assembling steps can be achieved.

The invention claimed is:

1. A multi-stage transmission comprising:
   a drive gear shaft and a driven gear shaft disposed in parallel relative to each other;
   a plurality of drive gears and a plurality of driven gears are supported on the drive gear shaft and the driven gear shaft, respectively, wherein the drive gears and the driven gears are constantly meshed with each other to constitute meshing gear combinations for different speeds;
   one of the drive gears and the driven gears are fixed to the gear shaft supporting the same, while the gear shaft supporting the other of the drive gears and the driven gears is a hollow gear shaft; and
   the other gears are supported on the hollow gear shaft individually in an engageable and disengageable manner through engaging means operated by gear shift driving means for gear shift;
   said engaging means comprises:
   engaging parts provided on an inner peripheral surface of each of the other gears at circumferentially spaced positions and having engaging surfaces in circumferential directions;
   engaging members provided in the hollow gear shaft and engageable respectively with the engaging parts of the other gears each in one rotational direction; and
   cam rods having sliding surfaces, respectively, in sliding contact with an inner peripheral surface of an inner hole of the hollow gear shaft so as to be movable in an axial direction of the hollow gear shaft, each said cam rod being provided at axially spaced locations with a plurality of cam surfaces for acting on the engaging members when moved axially;

said gear shift driving means comprises:

a control rod disposed axially slidably in the inner hole of the hollow gear shaft in sliding contact with the cam rods; and the control rod and the hollow gear shaft being inhibited from relative rotation by an anti-rotation mechanism.

2. The multi-stage transmission according to claim 1, wherein said gear shift driving means includes:

a shift drum rotatingly driven by an actuator;

a control rod operating element in engagement with a guide groove in the shift drum and movable axially of the hollow gear shaft upon rotation of the shift drum, to operate the control rod through a bearing.

3. The multi-stage transmission according to claim 1, wherein said anti-rotation mechanism includes mutually engaging splines between an end portion of the hollow gear shaft and the control rod, and some of the splines are eliminated to form a lubricant passage.

4. The multi-stage transmission according to claim 1, wherein said engaging means includes swing pawl members swingable about pivot pins on the hollow gear shaft.

5. The multi-stage transmission according to claim 2, wherein said anti-rotation mechanism includes mutually engaging splines between an end portion of the hollow gear shaft and the control rod, and some of the splines are eliminated to form a lubricant passage.

6. The multi-stage transmission according to claim 2, wherein said engaging means includes swing pawl members swingable about pivot pins on the hollow gear shaft.

* * * * *